US012165581B2

(12) United States Patent
Liu et al.

(10) Patent No.: US 12,165,581 B2
(45) Date of Patent: Dec. 10, 2024

(54) PIXEL CIRCUIT, DRIVING METHOD THEREFOR, AND DISPLAY APPARATUS

(71) Applicant: BOE Technology Group Co., Ltd., Beijing (CN)

(72) Inventors: Libin Liu, Beijing (CN); Li Wang, Beijing (CN); Guangliang Shang, Beijing (CN); Yu Feng, Beijing (CN); Long Han, Beijing (CN); Baoyun Wu, Beijing (CN); Shiming Shi, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 17/637,815

(22) PCT Filed: Apr. 23, 2021

(86) PCT No.: PCT/CN2021/089270
§ 371 (c)(1),
(2) Date: Feb. 24, 2022

(87) PCT Pub. No.: WO2022/222134
PCT Pub. Date: Oct. 27, 2022

(65) Prior Publication Data
US 2024/0105119 A1 Mar. 28, 2024

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); (Continued)

(58) Field of Classification Search
CPC ... G09G 3/32-3291; G09G 2300/0842; G09G 2300/0852; G09G 2300/0861; G09G 2300/0819
See application file for complete search history.

(56) References Cited

U.S. PATENT DOCUMENTS 9,460,662 B2 * 10/2016 Lee ...................... G09G 3/3275
9,966,007 B2 * 5/2018 Cho ...................... G06F 1/1652
(Continued)

FOREIGN PATENT DOCUMENTS

CN 101071539 A 11/2007
CN 104851392 A 8/2015
(Continued)

OTHER PUBLICATIONS

Notification to Go Through Registration Formalities dated Jun. 8, 2022 for Chinese Patent Application No. 202180000872.6 and English Translation.

(Continued)

*Primary Examiner* — Patrick F Marinelli
(74) *Attorney, Agent, or Firm* — Ling Wu; Stephen Yang; Ling and Yang Intellectual Property

(57) ABSTRACT

A pixel circuit, a driving method therefor and a display apparatus are provided. The pixel circuit includes a driving sub-circuit, a write sub-circuit, a compensation sub-circuit, a reset sub-circuit, a first light-emitting control sub-circuit, a second light-emitting control sub-circuit, a leak-proof sub-circuit, a storage sub-circuit and a light-emitting element. The reset sub-circuit is configured to reset a fourth node under control of a signal of a light-emitting control signal terminal and reset a fifth node under control of a signal of a reset control signal terminal. The compensation sub-circuit is configured to compensate a threshold voltage of the driving sub-circuit to the fifth node under the control of a signal of a first scanning signal terminal. The leak-proof sub-circuit is configured to write a signal of the fifth node into a first node under control of a signal of a second scanning signal terminal.

18 Claims, 7 Drawing Sheets

(52) U.S. Cl.
CPC . *G09G 2300/0861* (2013.01); *G09G 2310/08* (2013.01); *G09G 2320/0214* (2013.01); *G09G 2320/0233* (2013.01); *G09G 2320/0247* (2013.01); *G09G 2320/064* (2013.01); *G09G 2340/0435* (2013.01)

(56) References Cited

U.S. PATENT DOCUMENTS

| | | | | |
|---|---|---|---|---|
| 10,013,914 | B2 * | 7/2018 | Park | G09G 3/3283 |
| 10,490,128 | B1 | 11/2019 | Qian et al. | |
| 10,699,619 | B1 * | 6/2020 | Ma | G09G 3/20 |
| 10,720,104 | B2 * | 7/2020 | Gao | G09G 3/3291 |
| 10,902,779 | B2 * | 1/2021 | Li | G09G 3/3233 |
| 11,056,049 | B2 * | 7/2021 | Kim | G09G 3/3233 |
| 11,094,254 | B2 * | 8/2021 | Ueno | G09G 3/3275 |
| 11,282,462 | B2 * | 3/2022 | Lin | H01L 29/7869 |
| 11,373,588 | B2 * | 6/2022 | Kim | G09G 3/3233 |
| 11,380,257 | B2 * | 7/2022 | Xu | G09G 3/3233 |
| 11,398,187 | B2 * | 7/2022 | Ueno | G09G 3/3233 |
| 11,443,694 | B2 * | 9/2022 | Li | G09G 3/3258 |
| 11,450,275 | B2 * | 9/2022 | Li | G09G 3/2003 |
| 11,610,541 | B1 * | 3/2023 | Kim | G09G 3/3233 |
| 11,700,752 | B2 * | 7/2023 | Lee | H10K 59/126<br>345/174 |
| 11,798,465 | B2 * | 10/2023 | Kim | G09G 3/3233 |
| 11,869,432 | B2 * | 1/2024 | Li | G09G 3/2003 |
| 11,875,747 | B2 * | 1/2024 | Huangfu | G09G 3/3258 |
| 2009/0147164 | A1 | 6/2009 | Toyoshima et al. | |
| 2011/0187696 | A1 | 8/2011 | Slack et al. | |
| 2012/0019504 | A1 * | 1/2012 | Han | G09G 3/3233<br>345/212 |
| 2012/0038683 | A1 * | 2/2012 | Park | G09G 3/3233<br>345/77 |
| 2015/0287362 | A1 * | 10/2015 | Lee | G09G 3/3266<br>315/173 |
| 2015/0348466 | A1 * | 12/2015 | Park | G09G 3/3233<br>345/82 |
| 2016/0125809 | A1 * | 5/2016 | Hwang | G09G 3/3258<br>345/212 |
| 2016/0322446 | A1 * | 11/2016 | Park | G09G 3/3233 |
| 2017/0004766 | A1 | 1/2017 | Cho et al. | |
| 2017/0061875 | A1 | 3/2017 | Cho et al. | |
| 2017/0092196 | A1 | 3/2017 | Gupta et al. | |
| 2017/0092198 | A1 | 3/2017 | Ryu et al. | |
| 2017/0256200 | A1 | 9/2017 | Duan et al. | |
| 2017/0365218 | A1 * | 12/2017 | Jeong | G09G 3/3258 |
| 2018/0012552 | A1 | 1/2018 | Masui et al. | |
| 2018/0047337 | A1 | 2/2018 | Zhu et al. | |
| 2018/0114497 | A1 | 4/2018 | Tan et al. | |
| 2018/0175134 | A1 * | 6/2018 | Kim | H10K 59/1213 |
| 2018/0286313 | A1 | 10/2018 | Zheng | |
| 2019/0043420 | A1 * | 2/2019 | Jung | G09G 3/3225 |
| 2019/0130833 | A1 * | 5/2019 | Gao | G09G 3/3291 |
| 2019/0221165 | A1 * | 7/2019 | Park | G09G 3/3233 |
| 2019/0311678 | A1 | 10/2019 | Lee | |
| 2019/0340977 | A1 | 11/2019 | Park et al. | |
| 2020/0074921 | A1 | 3/2020 | Peng et al. | |
| 2020/0074928 | A1 * | 3/2020 | Li | G09G 3/3233 |
| 2020/0160795 | A1 | 5/2020 | Heo et al. | |
| 2020/0193916 | A1 | 6/2020 | Park et al. | |
| 2020/0211432 | A1 * | 7/2020 | Ma | G09G 3/20 |
| 2020/0388217 | A1 * | 12/2020 | Yuan | G09G 3/3233 |
| 2020/0394962 | A1 | 12/2020 | Seo et al. | |
| 2021/0027696 | A1 * | 1/2021 | Kim | G09G 3/32 |
| 2021/0056901 | A1 * | 2/2021 | Ueno | G09G 3/3266 |
| 2021/0065624 | A1 * | 3/2021 | Li | G09G 3/3233 |
| 2021/0125562 | A1 * | 4/2021 | Li | G09G 3/3258 |
| 2021/0158755 | A1 | 5/2021 | Li et al. | |
| 2021/0225282 | A1 * | 7/2021 | Cho | G09G 3/3233 |
| 2021/0350745 | A1 * | 11/2021 | Huang | G09G 3/3233 |
| 2021/0407402 | A1 * | 12/2021 | Xu | G09G 3/3233 |
| 2022/0122522 | A1 | 4/2022 | Li et al. | |
| 2022/0157238 | A1 * | 5/2022 | Wang | G09G 3/3233 |
| 2022/0335890 | A1 * | 10/2022 | Li | G09G 3/3233 |
| 2023/0006020 | A1 * | 1/2023 | Lee | G09G 3/3258 |
| 2023/0108865 | A1 * | 4/2023 | Kim | G09G 3/32<br>345/55 |
| 2023/0316989 | A1 * | 10/2023 | Son | G09G 3/32<br>345/55 |
| 2023/0317007 | A1 * | 10/2023 | Kim | G09G 3/3233<br>345/76 |
| 2023/0320134 | A1 * | 10/2023 | Kim | H10K 59/121<br>257/40 |
| 2023/0335056 | A1 * | 10/2023 | Cho | G09G 3/3233 |

FOREIGN PATENT DOCUMENTS

| | | | |
|---|---|---|---|
| CN | 105632440 | A | 6/2016 |
| CN | 106328056 | A | 1/2017 |
| CN | 106558285 | A | 4/2017 |
| CN | 106847189 | A | 6/2017 |
| CN | 108346399 | A | 7/2018 |
| CN | 110827756 | A | 2/2020 |
| CN | 111210784 | A | 5/2020 |
| CN | 111243521 | A | 6/2020 |
| CN | 111276096 | A | 6/2020 |
| CN | 111341258 | A | 6/2020 |
| CN | 111341269 | A | 6/2020 |
| CN | 111354293 | A | 6/2020 |
| CN | 111354307 | A | 6/2020 |
| CN | 111477169 | A | 7/2020 |
| CN | 111540315 | A | 8/2020 |
| CN | 111696484 | A | 9/2020 |
| CN | 111724745 | A | 9/2020 |
| CN | 111754938 | A | 10/2020 |
| CN | 111916027 | A | 11/2020 |
| CN | 111968574 | A | 11/2020 |
| CN | 112071262 | A | 12/2020 |
| CN | 112150967 | A | 12/2020 |
| CN | 112233616 | A | 1/2021 |
| CN | 112289264 | A | 1/2021 |
| CN | 112509519 | A | 3/2021 |
| EP | 3343552 | A1 | 7/2018 |
| JP | 20060222462 | A | 8/2006 |
| WO | 2016088666 | A1 | 6/2016 |

OTHER PUBLICATIONS

The First Office Action dated Mar. 18, 2022 for Chinese Patent Application No. 202180000872.6 and English Translation.

* cited by examiner

PIXEL CIRCUIT, DRIVING METHOD THEREFOR, AND DISPLAY APPARATUS

CROSS-REFERENCE TO RELATED APPLICATION

The present disclosure is a U.S. National Phase Entry of International Application PCT/CN2021/089270 having an international filing date of Apr. 23, 2021, and the contents disclosed in the above-mentioned application are hereby incorporated as a part of this application.

TECHNICAL FIELD

Embodiments of the present disclosure relate to, but are not limited to the technical field of display, and in particular to a pixel circuit, a method for driving the pixel circuit, and a display apparatus.

BACKGROUND

As an active light-emitting display device, Organic Light-emitting Diode (OLED) has advantages such as self-luminescence, wide viewing angle, high contrast, low power consumption, extremely quick response, etc., and has been widely applied to display products such as mobile phones, tablet computers and digital cameras. OLED displaying is current-driven, and requires a current to be output to an OLED through a pixel circuit to drive the OLED to emit light.

SUMMARY

The following is a summary of subject matters described in the present disclosure in detail. The summary is not intended to limit the scope of protection of the claims.

An embodiment of the present disclosure provides a pixel circuit, which includes a driving sub-circuit, a write sub-circuit, a compensation sub-circuit, a reset sub-circuit, a first light-emitting control sub-circuit, a second light-emitting control sub-circuit, a leak-proof sub-circuit, a storage sub-circuit and a light-emitting element.

The driving sub-circuit is connected with a first node, a second node and a third node respectively, and is configured to provide a driving current for the third node under the control of signals of the first node and the second node.

The write sub-circuit is connected with a first scanning signal terminal, a data signal terminal and the second node respectively, and is configured to write a signal of the data signal terminal into the second node under control of a signal of the first scanning signal terminal.

The compensation sub-circuit is connected with the first scanning signal terminal, the third node and a fifth node respectively, and is configured to compensate a threshold voltage of the driving sub-circuit to the fifth node under control of the signal of the first scanning signal terminal.

The leak-proof sub-circuit is connected with a second scanning signal terminal, the first node and the fifth node respectively, and is configured to write a signal of the fifth node into the first node under control of a signal of the second scanning signal terminal.

The storage sub-circuit is connected with a first voltage terminal and the first node respectively, and is configured to store a voltage of a control terminal of the driving sub-circuit.

The reset sub-circuit is connected with a reset control signal terminal, a light-emitting control signal terminal, an initial signal terminal, a fourth node and the fifth node respectively, and is configured to reset the fourth node under the control of a signal of the light-emitting control signal terminal and reset the fifth node under control of a signal of the reset control signal terminal.

The second light-emitting control sub-circuit is connected with the first voltage terminal, the light-emitting control signal terminal and the second node respectively, and is configured to form a path between the first voltage terminal and the second node under the control of the signal of the light-emitting control signal terminal.

The first light-emitting control sub-circuit is connected with the light-emitting control signal terminal, the third node and the fourth node respectively, and is configured to form a path between the third node and the fourth node under the control of the signal of the light-emitting control signal terminal.

One end of the light-emitting element is connected with the fourth node, and the other end of the light-emitting element is connected with a second voltage terminal.

In an exemplary embodiment, the compensation sub-circuit includes a second transistor. The storage sub-circuit includes a first capacitor. The driving sub-circuit includes a third transistor. The write sub-circuit includes a fourth transistor.

A control electrode of the second transistor is connected with the first scanning signal terminal. A first electrode of the second transistor is connected with the third node. A second electrode of the second transistor is connected with the fifth node.

One end of the first capacitor is connected with the first node, and the other end of the first capacitor is connected with the first voltage terminal.

A control electrode of the third transistor is connected with the first node. A first electrode of the third transistor is connected with the second node. A second electrode of the third transistor is connected with the third node.

A control electrode of the fourth transistor is connected with the first scanning signal terminal. A first electrode of the fourth transistor is connected with the data signal terminal. A second electrode of the fourth transistor is connected with the second node.

In an exemplary embodiment, the second light-emitting control sub-circuit includes a fifth transistor. The first light-emitting control sub-circuit includes a sixth transistor.

A control electrode of the fifth transistor is connected with the light-emitting control signal terminal. A first electrode of the fifth transistor is connected with the first voltage terminal. A second electrode of the fifth transistor is connected with the second node.

A control electrode of the sixth transistor is connected with the light-emitting control signal terminal. A first electrode of the sixth transistor is connected with the third node. A second electrode of the sixth transistor is connected with the fourth node.

In an exemplary embodiment, the reset sub-circuit includes a first transistor and a seventh transistor. The leak-proof sub-circuit includes an eighth transistor.

A control electrode of the first transistor is connected with the reset control signal terminal. A first electrode of the first transistor is connected with the initial signal terminal. A second electrode of the first transistor is connected with the fifth node.

A control electrode of the seventh transistor is connected with the light-emitting control signal terminal. A first electrode of the seventh transistor is connected with the initial signal terminal. A second electrode of the seventh transistor is connected with the fourth node.

A control electrode of the eighth transistor is connected with the second scanning signal terminal. A first electrode of the eighth transistor is connected with the fifth node. A second electrode of the eighth transistor is connected with the first node.

In an exemplary embodiment, the compensation sub-circuit includes a second transistor. The storage sub-circuit includes a first capacitor. The driving sub-circuit includes a third transistor. The write sub-circuit includes a fourth transistor. The second light-emitting control sub-circuit includes a fifth transistor. The first light-emitting control sub-circuit includes a sixth transistor. The reset sub-circuit includes a first transistor and a seventh transistor. The leak-proof sub-circuit includes an eighth transistor.

A control electrode of the second transistor is connected with the first scanning signal terminal. A first electrode of the second transistor is connected with the third node. A second electrode of the second transistor is connected with the fifth node.

One end of the first capacitor is connected with the first node, while the other end is connected with the first voltage terminal.

A control electrode of the third transistor is connected with the first node. A first electrode of the third transistor is connected with the second node. A second electrode of the third transistor is connected with the third node.

A control electrode of the fourth transistor is connected with the first scanning signal terminal. A first electrode of the fourth transistor is connected with the data signal terminal. A second electrode of the fourth transistor is connected with the second node. A control electrode of the fifth transistor is connected with the light-emitting control signal terminal. A first electrode of the fifth transistor is connected with the first voltage terminal. A second electrode of the fifth transistor is connected with the second node.

A control electrode of the sixth transistor is connected with the light-emitting control signal terminal. A first electrode of the sixth transistor is connected with the third node. A second electrode of the sixth transistor is connected with the fourth node. A control electrode of the first transistor is connected with the reset control signal terminal. A first electrode of the first transistor is connected with the first initial signal terminal. A second electrode of the first transistor is connected with the fifth node.

A control electrode of the seventh transistor is connected with the light-emitting control signal terminal. A first electrode of the seventh transistor is connected with the initial signal terminal. A second electrode of the seventh transistor is connected with the fourth node.

A control electrode of the eighth transistor is connected with the second scanning signal terminal. A first electrode of the eighth transistor is connected with the fifth node. A second electrode of the eighth transistor is connected with the first node.

each of the first transistor to the sixth transistor is a P-type transistor. Each of the seventh transistor and the eighth transistor is an N-type transistor.

In an exemplary embodiment, the reset sub-circuit includes a first reset sub-circuit and a second reset sub-circuit. The initial signal terminal includes a first initial signal terminal and a second initial signal terminal.

The first reset sub-circuit is connected with the reset control signal terminal, the first initial signal terminal and the fifth node respectively, and is configured to write a signal of the first initial signal terminal into the fifth node under the control of the signal of the reset control signal terminal.

The second reset sub-circuit is connected with the light-emitting control signal terminal, the second initial signal terminal and the fourth node respectively, and is configured to write a signal of the second initial signal terminal into the fourth node under the control of the signal of the light-emitting control signal terminal.

In an exemplary embodiment, the first reset sub-circuit includes a first transistor. The second reset sub-circuit includes a seventh transistor.

A control electrode of the first transistor is connected with the reset control signal terminal. A first electrode of the first transistor is connected with the first initial signal terminal. A second electrode of the first transistor is connected with the fifth node.

A control electrode of the seventh transistor is connected with the light-emitting control signal terminal. A first electrode of the seventh transistor is connected with the second initial signal terminal. A second electrode of the seventh transistor is connected with the fourth node.

In an exemplary embodiment, the pixel circuit further includes a gradient dimming module.

The gradient dimming module is configured to provide signals of multiple frequencies for multiple signal terminals, the multiple signal terminals include at least one of the reset control signal terminal, the first scanning signal terminal, the light-emitting control signal terminal and the second scanning signal terminal.

In an exemplary embodiment, the gradient dimming module providing the signals of the multiple frequencies for the multiple signal terminals includes:

when a display panel is in a second display mode, a data refresh frequency of the pixel circuit is a second frequency, and a frequency of the signal of the light-emitting control signal terminal is a third frequency, the third frequency is higher than the second frequency. The second display mode includes a refresh frame stage and a retention frame stage. The pixel circuit refreshes data in the refresh frame stage. A duty ratio of the signal of the light-emitting control signal terminal varies with time in the retention frame stage.

In an exemplary embodiment, when the display panel is in the second display mode, each of a frequency of the signal of the reset control signal terminal, a frequency of the signal of the first scanning signal terminal and a frequency of the signal of the second scanning signal terminal is the second frequency.

An embodiment of the present disclosure further provides a display apparatus, which includes any above-mentioned pixel circuit.

An embodiment of the present disclosure further provides a method for driving a pixel circuit, which is used for driving any above-mentioned pixel circuit and includes:

when a display panel is in a second display mode, determining that a data refresh frequency of the pixel circuit is a second frequency and a frequency of a signal of the light-emitting control signal terminal is a third frequency, wherein the third frequency is higher than the second frequency.

The second display mode includes a refresh frame stage and a retention frame stage. The pixel circuit refreshes data in the refresh frame stage. A duty ratio of the signal of the light-emitting control signal terminal varies with time in the retention frame stage.

In an exemplary embodiment, when the display panel is in the second display mode, each of a frequency of the signal of the reset control signal terminal, a frequency of the signal of the first scanning signal terminal and a frequency of the signal of the second scanning signal terminal is the second frequency.

In an exemplary embodiment, the driving method further includes: when the display panel is in a first display mode, determining that the data refresh frequency of the pixel circuit is a first frequency and each of a frequency of the signal of the reset control signal terminal, a frequency of the signal of the first scanning signal terminal, a frequency of the signal of the light-emitting control signal terminal and a frequency of the signal of the second scanning signal terminal is the first frequency, and the first frequency is higher than the second frequency.

In an exemplary embodiment, the first display mode includes multiple first display cycles. The first display cycle includes a reset stage, a data write stage and a light-emitting stage.

In the reset stage, the reset sub-circuit resets the fourth node under the control of the signal of the light-emitting control signal terminal and resets the fifth node under the control of the signal of the reset control signal terminal, and the leak-proof sub-circuit writes the signal of the fifth node to the first node under the control of the signal of the second scanning signal terminal.

In the data write stage, the write sub-circuit writes the signal of the data signal terminal into the second node under the control of the signal of the first scanning signal terminal, the compensation sub-circuit compensates the threshold voltage of the driving sub-circuit to the fifth node under the control of the signal of the first scanning signal terminal, the leak-proof sub-circuit writes the signal of the fifth node into the first node under the control of the signal of the second scanning signal terminal, and the storage sub-circuit stores the voltage of the control terminal of the driving sub-circuit.

In a light-emitting stage, the second light-emitting control sub-circuit forms a path between the first voltage terminal and the second node under the control of the signal of the light-emitting control signal terminal, the driving sub-circuit provides a driving current for the third node under the control of the signals of the first node and the second node, and the first light-emitting control sub-circuit forms a path between the third node and the fourth node under the control of the signal of the light-emitting control signal terminal.

In an exemplary embodiment, the first display cycle further includes an adjustment stage. A time length of the adjustment stage is m scanning sub-cycles. Each scanning sub-cycle corresponds to one grid line group. The display panel includes N grid line groups, m is an integer greater than or equal to 0, and N is an integer larger than m.

In the adjustment stage, the reset sub-circuit resets the fourth node under the control of the signal of the light-emitting control signal terminal, and the leak-proof sub-circuit writes the signal of the fifth node into the first node under the control of the signal of the second scanning signal terminal.

In an exemplary embodiment, the second display mode includes multiple second display cycles. The second display cycle includes a first brightness retention stage, a brightness decrease stage and a brightness increase stage. One of the brightness decrease stage and the brightness increase stage sequentially includes the reset stage, the data write stage and the light-emitting stage, and the other of the brightness decrease stage and the brightness increase stage includes multiple light-emitting stages and multiple off stages, wherein the light-emitting stages and the off stages are spaced from each other.

In the off stage, the second light-emitting control sub-circuit cuts off the path between the first voltage terminal and the second node under the control of the signal of the light-emitting control signal terminal, and the first light-emitting control sub-circuit cuts off the path between the third node and the fourth node under the control of the signal of the light-emitting control signal terminal.

In an exemplary embodiment, one of the brightness decrease stage and the brightness increase stage further includes multiple light-emitting stages and multiple off stages, and the light-emitting stages and the off stages are spaced from each other.

In an exemplary embodiment, a duty ratio of the light-emitting control signal decreases row by row or frame by frame in the brightness decrease stage. The duty ratio of the light-emitting control signal remains unchanged in the first brightness retention stage. The duty ratio of the light-emitting control signal increases row by row or frame by frame in the brightness increase stage.

In an exemplary embodiment, the second display mode includes multiple second display cycles. The second display cycle includes a first brightness retention stage, a brightness decrease stage, a second brightness retention stage and a brightness increase stage. Brightness of the light-emitting element in the first brightness retention stage is higher than that of the light-emitting element in the second brightness retention stage. One of the brightness decrease stage, the second brightness retention stage and the brightness increase stage sequentially includes the reset stage, the data write stage and the light-emitting stage, and each of the other two stages and the first brightness retention stage includes multiple light-emitting stages and multiple off stages, wherein the light-emitting stages and the off stages are spaced from each other.

In the off stage, the second light-emitting control sub-circuit cuts off the path between the first voltage terminal and the second node under the control of the signal of the light-emitting control signal terminal, and the first light-emitting control sub-circuit cuts off the path between the third node and the fourth node under the control of the signal of the light-emitting control signal terminal.

In an exemplary embodiment, one of the brightness decrease stage, the second brightness retention stage and the brightness increase stage further includes multiple light-emitting stages and multiple off stages, and the light-emitting stages and the off stages are spaced from each other.

In an exemplary embodiment, a duty ratio of the light-emitting control signal decreases row by row or frame by frame in the brightness decrease stage. The duty ratio of the light-emitting control signal is equal to a first duty ratio in the first brightness retention stage. The duty ratio of the light-emitting control signal is equal to a second duty ratio in the second brightness retention stage, wherein the first duty ratio is higher than the second duty ratio. The duty ratio of the light-emitting control signal increases row by row or frame by frame in the brightness increase stage.

Other aspects may be comprehended upon reading and understanding of the drawings and the detailed descriptions.

BRIEF DESCRIPTION OF DRAWINGS

Accompanying drawings are used to provide a further understanding of technical solutions of the present disclosure, constitute a part of the specification, and are used to explain, together with the embodiments of the present disclosure, the technical solutions of the present disclosure and not intended to form limitations on the technical solutions of the present disclosure. Shapes and sizes of components in the drawings do not reflect actual scales, and are only intended to schematically describe the contents of the present disclosure.

DETAILED DESCRIPTION

Figure 1:
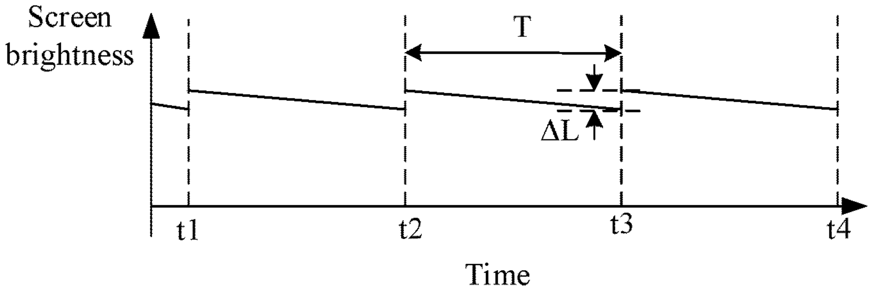
FIG. 1 is a schematic diagram of hopping of screen brightness during data refresh in a low-frequency mode.

The embodiments of the present disclosure will be described in detail below with reference to the drawings. It is to be noted that implementation modes may be implemented in various forms. Those of ordinary skills in the art may readily understand a fact that implementation modes and contents may be transformed into various forms without departing from the objective and scope of the present disclosure. Therefore, the present disclosure should not be explained as being limited to the contents recorded in the following implementation modes only. The embodiments in the present disclosure and features in the embodiments may be randomly combined with each other if there is no conflict.

Unless otherwise defined, technical terms or scientific terms used in the embodiments of the present disclosure should have the same meanings as commonly understood by those of ordinary skills in the art to which the present disclosure pertains. "First", "second", and similar terms used in the embodiments of the present disclosure do not represent any order, number, or significance but are only used to distinguish different components. "Include", "contain", or a similar term means that an element or object appearing before the term covers an element or object listed after the term and equivalent thereof and does not exclude other elements or objects.

In the embodiments of the present disclosure, a transistor refers to an element that at least includes three terminals, i.e., a gate electrode, a drain electrode, and a source electrode. The transistor has a channel region between the drain electrode (drain electrode terminal, drain region, or drain electrode) and the source electrode (source electrode terminal, source region, or source electrode), and a current can flow through the drain electrode, the channel region, and the source region. It is to be noted that, in this specification, the channel region refers to a region through which the current mainly flows.

In this specification, the first electrode may be a drain electrode, and the second electrode may be a source electrode. Alternatively, the first electrode may be a source electrode, and the second electrode may be a drain electrode. In a case that transistors with opposite polarities are used, or a current direction changes during operation of a circuit, or the like, functions of the "source electrode" and the "drain electrode" are sometimes interchangeable. Therefore, the "source electrode" and the "drain electrode" are interchangeable in this specification.

In this specification, "connection" includes a case where composition elements are connected with each other through an element with a certain electric action. "The element with the certain electric action" is not particularly limited as long as electric signals can be sent and received between the connected constituent elements. Examples of "the element with the certain electric action" not only include electrodes and wirings, but also include switching elements such as transistors, resistors, inductors, capacitors, other elements with various functions, etc.

The OLED display apparatuses is commonly recognized as the most potential display apparatus due to its various advantages such as self-luminescence, low driving voltage, high light-emitting efficiency, short response time, wide usage temperature range, etc. OLEDs are divided into Passive Matrix OLED (PMOLED) and Active Matrix OLED (AMOLED) according to drive modes. There are multiple pixels arranged in an array in an AMOLED display apparatus, wherein each pixel is driven by a pixel driving circuit to emit light. For a dynamic picture, a refresh frequency of the picture may be increased to improve the display quality. For some relatively still pictures, high-frequency refresh is unnecessary, and thus refresh frequencies of the pictures may be reduced to save power consumption of the display apparatus. In order to achieve characteristics of both high-frequency refresh and low power consumption of the AMOLED display apparatus, the AMOLED display apparatus needs to support dynamic frequency refresh.

At present, Always On Display (AOD) becomes a required function of many portable devices such as smart phones and smart watches. In an AOD mode, display information of a picture is time and simple information, and there is no need to refresh the picture at a high rate. Since AOD occupies relatively long use time of a user, low-frequency refresh is conducive to reducing the power consumption of the device and prolonging service life of a battery.

In a pixel circuit using a Low Temperature Polycrystalline Oxide (LTPO) technology, a switch Thin Film Transistor (TFT) connected with a control electrode of a Drive Thin Film Transistor (DTFT) is replaced with a low-leak oxide TFT. Since the leak of the oxide TFT may be 10 to 16 A or even lower, brightness of an OLED varies slightly within long time (more than 0.1 s, or even more than 1 s). Therefore, low-frame-frequency displaying and high retention rate of brightness retention may be implemented.

As shown in FIG. 1, moments t1, t2, t3 and t4 are all data update moments in a conventional low-frequency working mode. At these moments, a data update frame may be refreshed to the control electrode of the DTFT, thereby controlling a driving current flowing through the OLED. Time except the moments t1, t2, t3 and t4 belongs to a brightness retention stage. Although the leak of the oxide TFT is quite low (over 98% of the brightness is retained within 1 s), the control electrode of the drive thin film transistor still keeps leaking with an increase in time of the brightness retention stage. Therefore, a brightness difference $\Delta L$ ($\Delta L \propto t \times Ioff$) may be generated in the OLED at each data update moment. In order to keep the present product flicker-free, a data update cycle T may be restricted, for example, $T \leq 1$ s.

Figure 2:
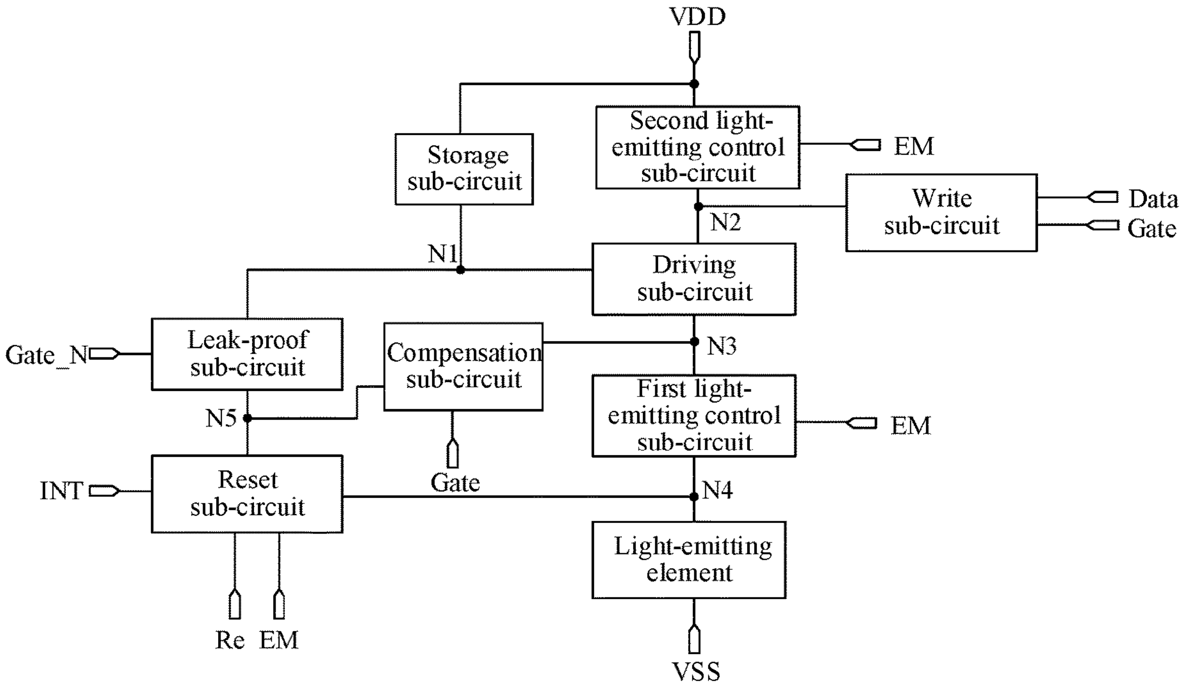
FIG. 2 is a schematic structural diagram of a pixel circuit according to an embodiment of the present disclosure.

An embodiment of the present disclosure provides a pixel circuit. FIG. 2 is a schematic structural diagram of a pixel circuit according to an embodiment of the present disclosure. As shown in FIG. 2, the pixel circuit includes a driving sub-circuit, a write sub-circuit, a compensation sub-circuit, a reset sub-circuit, a first light-emitting control sub-circuit, a second light-emitting control sub-circuit, a leak-proof sub-circuit, a storage sub-circuit, and a light-emitting element.

The driving sub-circuit is connected with a first node N1, a second node N2 and a third node N3 respectively, and is configured to provide a driving current for the third node N3 under the control of signals of the first node N1 and the second node N2.

The write sub-circuit is connected with a first scanning signal terminal Gate, a data signal terminal Data and the second node N2 respectively, and is configured to write a signal of the data signal terminal Data into the second node N2 under the control of a signal of the first scanning signal terminal Gate.

The compensation sub-circuit is connected with the first scanning signal terminal Gate, the third node N3 and a fifth node N5 respectively, and is configured to compensate a threshold voltage of the driving sub-circuit to the fifth node N5 under the control of the signal of the first scanning signal terminal Gate.

The leak-proof sub-circuit is connected with a second scanning signal terminal Gate N, the first node N1 and the fifth node N5 respectively, and is configured to write a signal of the fifth node N5 into the first node N1 under the control of a signal of the second scanning signal terminal Gate N.

The storage sub-circuit is connected with a first voltage terminal VDD and the first node N1 respectively, and is configured to store a voltage of a control terminal of the driving sub-circuit.

The reset sub-circuit is connected with a reset control signal terminal Re, a light-emitting control signal terminal EM, an initial signal terminal INT, a fourth node N4 and the fifth node N5 respectively, and is configured to reset the fourth node N4 under the control of a signal of the light-emitting control signal EM end and reset the fifth node N5 under the control of a signal of the reset control signal terminal Re.

The second light-emitting control sub-circuit is connected with the first voltage terminal VDD, the light-emitting control signal terminal EM and the second node N2 respectively, and is configured to form a path between the first voltage terminal VDD and the second node N2 under the control of the signal of the light-emitting control signal terminal EM.

The first light-emitting control sub-circuit is connected with the light-emitting control signal terminal EM, the third node N3 and the fourth node N4 respectively, and is configured to form a path between the third node N3 and the fourth node N4 under the control of the signal of the light-emitting control signal terminal EM.

One end of the light-emitting element is connected with the fourth node N4, while the other end of the light-emitting element is connected with a second voltage terminal VS S.

According to the pixel circuit provided in the embodiment of the present disclosure, the compensation sub-circuit compensates the threshold voltage of the driving sub-circuit to the fifth node N5 under the control of the signal of the first scanning signal terminal Gate, the leak-proof sub-circuit writes the signal of the fifth node N5 into the first node N1 under the control of the signal of the second scanning signal terminal Gate N, and the reset sub-circuit resets the fourth node N4 under the control of the signal of the light-emitting control signal terminal EM. In this way, the compensation for a voltage of a control terminal of the driving sub-circuit is achieved, influence of a threshold voltage drift of the driving sub-circuit on a driving current of the light-emitting element is avoided, and uniformity of a display image and display quality of a display panel are improved. According to the pixel circuit of the embodiment of the present disclosure, the voltage leak of the control terminal of the driving sub-circuit is low, and high retention rate of brightness of the light-emitting element is achieved. In addition, according to the pixel circuit of the embodiment of the present disclosure, the resetting/brightness adjustment of the light-emitting element can be implemented cyclically in a low-frequency refresh stage only by cyclically controlling the signal of the light-emitting control signal terminal EM rather than cyclically controlling the signals of the first scanning signal terminal Gate and the reset control signal terminal Re, thereby brightness equalization is achieved.

Figure 3:
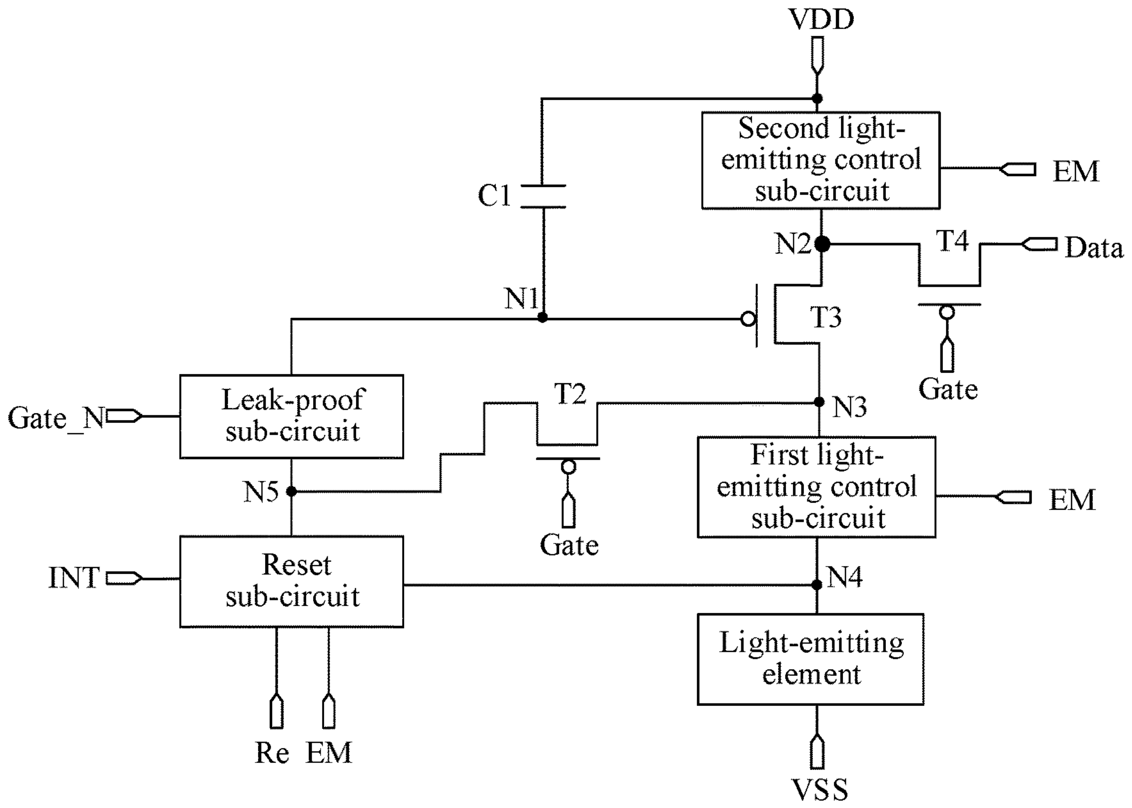
FIG. 3 is an equivalent circuit diagram of a compensation sub-circuit, a storage sub-circuit, a driving sub-circuit and a write sub-circuit according to an embodiment of the present disclosure.

In an exemplary embodiment, FIG. 3 is an equivalent circuit diagram of a driving sub-circuit, a write sub-circuit, a compensation sub-circuit and a storage sub-circuit according to an embodiment of the present disclosure. As shown in FIG. 3, the compensation sub-circuit provided in the embodiment of the present disclosure includes a second transistor T2. The storage sub-circuit includes a first capacitor C1. The driving sub-circuit includes a third transistor (i.e., drive thin film transistor) T3. The write sub-circuit includes a fourth transistor T4.

Among them, a control electrode of the second transistor T2 is connected with the first scanning signal terminal Gate. A first electrode of the second transistor T2 is connected with the third node N3. A second electrode of the second transistor T2 is connected with the fifth node N5.

One end of the first capacitor C1 is connected with the first node N1. The other end of the first capacitor C1 is connected with the first voltage terminal VDD.

A control electrode of the third transistor T3 is connected with the first node N1. A first electrode of the third transistor T3 is connected with the second node N2. A second electrode of the third transistor T3 is connected with the third node N3.

A control electrode of the fourth transistor T4 is connected with the first scanning signal terminal Gate. A first electrode of the fourth transistor T4 is connected with the data signal terminal Data. A second electrode of the fourth transistor T4 is connected with the second node N2.

FIG. 3 shows an exemplary structure of the driving sub-circuit, the write sub-circuit, the compensation sub-circuit and the storage sub-circuit. It is easy for those skilled in the art to understand that implementation modes of the driving sub-circuit, the write sub-circuit, the compensation sub-circuit and the storage sub-circuit are not limited thereto as long as functions thereof can be implemented.

Figure 4:
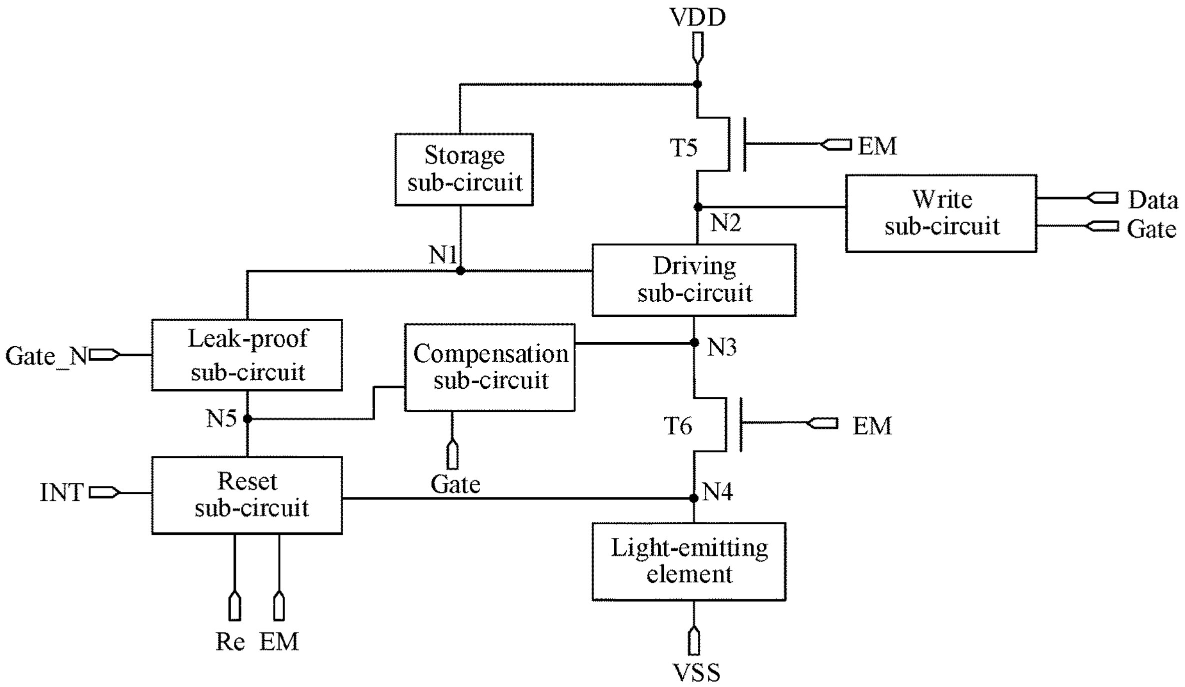
FIG. 4 is an equivalent circuit diagram of a second light-emitting control sub-circuit and a first light-emitting control sub-circuit according to an embodiment of the present disclosure.

In an exemplary embodiment, FIG. 4 is an equivalent circuit diagram of a second light-emitting control sub-circuit and a first light-emitting control sub-circuit according to an embodiment of the present disclosure. As shown in FIG. 4, the second light-emitting control sub-circuit provided in the embodiment of the present disclosure includes a fifth transistor T5. The first light-emitting control sub-circuit includes a sixth transistor T6.

Among them, a control electrode of the fifth transistor T5 is connected with the light-emitting control signal terminal EM. A first electrode of the fifth transistor T5 is connected with the first voltage terminal VDD. A second electrode of the fifth transistor T5 is connected with the second node N2.

A control electrode of the sixth transistor T6 is connected with the light-emitting control signal terminal EM. A first electrode of the sixth transistor T6 is connected with the third node N3. A second electrode of the sixth transistor T6 is connected with the fourth node N4.

FIG. 4 shows an exemplary structure of the second light-emitting control sub-circuit and the first light-emitting control sub-circuit. It is easy for those skilled in the art to understand that implementation modes of the second light-emitting control sub-circuit and the first light-emitting control sub-circuit are not limited thereto as long as functions thereof can be implemented.

Figure 5:
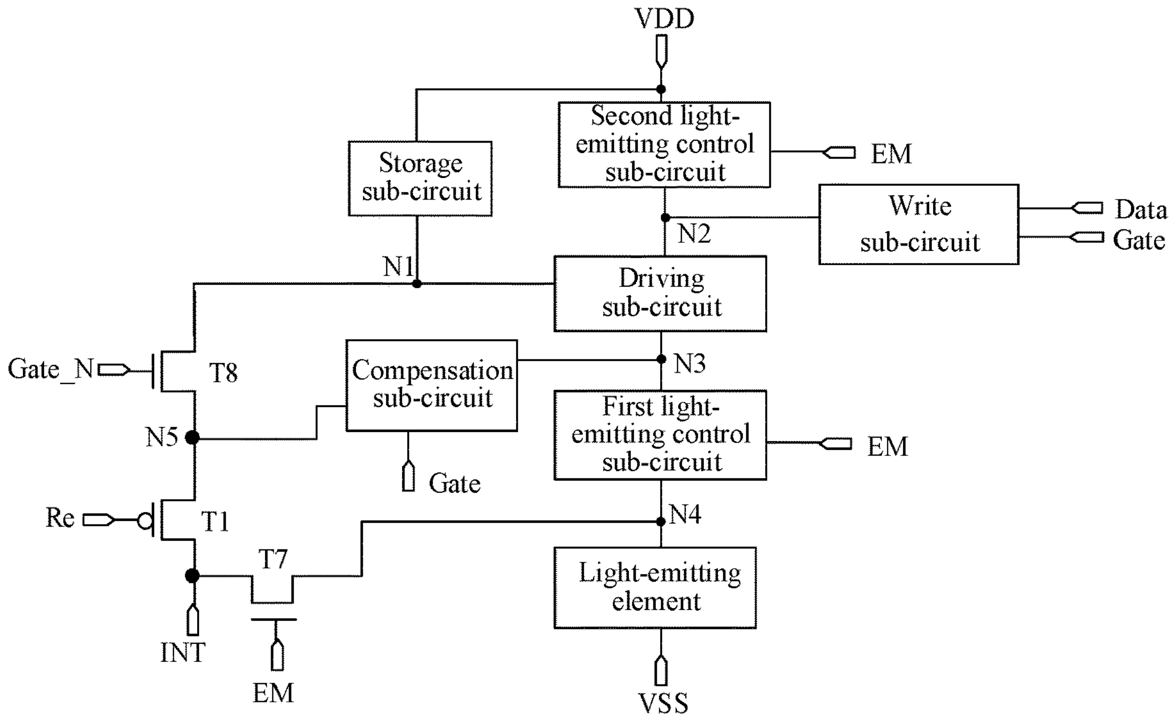
FIG. 5 is an equivalent circuit diagram of a reset sub-circuit and a leak-proof sub-circuit according to an embodiment of the present disclosure.

In an exemplary embodiment, FIG. 5 is an equivalent circuit diagram of a reset sub-circuit and a leak-proof sub-circuit according to an embodiment of the present disclosure. As shown in FIG. 5, the reset sub-circuit provided in the embodiment of the present disclosure includes a first transistor T1 and a seventh transistor T7. The leak-proof sub-circuit includes an eighth transistor T8.

Among them, a control electrode of the first transistor T1 is connected with the reset control signal terminal Re. A first electrode of the first transistor T1 is connected with the initial signal terminal INT. A second electrode of the first transistor T1 is connected with the fifth node.

A control electrode of the seventh transistor T7 is connected with the light-emitting control signal terminal EM. A first electrode of the seventh transistor T7 is connected with the initial signal terminal INT. A second electrode of the seventh transistor T7 is connected with the fourth node N4.

A control electrode of the eighth transistor T8 is connected with the second scanning signal terminal Gate N. A first electrode of the eighth transistor T8 is connected with the fifth node N5. A second electrode of the eighth transistor T8 is connected with the first node N1.

FIG. 5 shows an exemplary structure of the reset sub-circuit and the leak-proof sub-circuit. It is easy for those skilled in the art to understand that implementation modes of the reset sub-circuit and the leak-proof sub-circuit are not limited thereto as long as functions thereof can be implemented.

Figure 6:
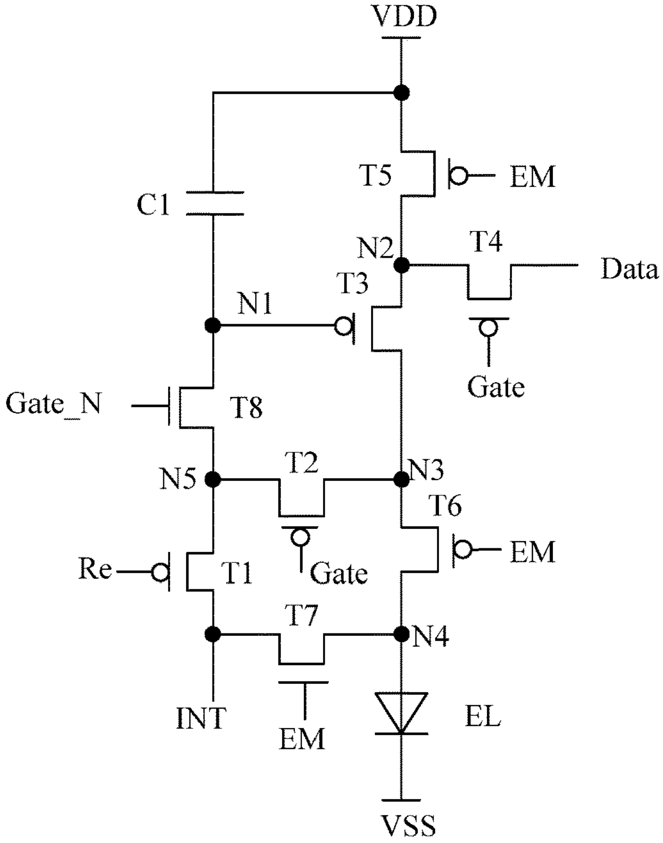
FIG. 6 is an equivalent circuit diagram of a pixel circuit according to an embodiment of the present disclosure.

FIG. 6 is an equivalent circuit diagram of a pixel circuit according to an embodiment of the present disclosure. As shown in FIG. 6, in the pixel circuit provided in the embodiment of the present disclosure, the compensation sub-circuit includes a second transistor T2. The storage sub-circuit includes a first capacitor C1. The driving sub-circuit includes a third transistor T3. The write sub-circuit includes a fourth transistor T4. The second light-emitting control sub-circuit includes a fifth transistor T5. The first light-emitting control sub-circuit includes a sixth transistor T6. The reset sub-circuit includes a first transistor T1 and a seventh transistor T7. The leak-proof sub-circuit includes an eighth transistor T8.

Among them, a control electrode of the second transistor T2 is connected with the first scanning signal terminal Gate. A first electrode of the second transistor T2 is connected with the third node N3. A second electrode of the second transistor T2 is connected with the fifth node N5.

One end of the first capacitor C1 is connected with the first node N1, and the other end of the first capacitor C1 is connected with the first voltage terminal VDD.

A control electrode of the third transistor T3 is connected with the first node N1. A first electrode of the third transistor T3 is connected with the second node N2. A second electrode of the third transistor T3 is connected with the third node N3.

A control electrode of the fourth transistor T4 is connected with the first scanning signal terminal Gate. A first electrode of the fourth transistor T4 is connected with the data signal terminal Data. A second electrode of the fourth transistor T4 is connected with the second node N2.

A control electrode of the fifth transistor T5 is connected with the light-emitting control signal terminal EM. A first electrode of the fifth transistor T5 is connected with the first voltage terminal VDD. A second electrode of the fifth transistor T5 is connected with the second node N2.

A control electrode of the sixth transistor T6 is connected with the light-emitting control signal terminal EM. A first electrode of the sixth transistor T6 is connected with the third node N3. A second electrode of the sixth transistor T6 is connected with the fourth node N4.

A control electrode of the first transistor T1 is connected with the reset control signal terminal Re. A first electrode of the first transistor T1 is connected with the initial signal terminal INT. A second electrode of the first transistor T1 is connected with the fifth node.

A control electrode of the seventh transistor T7 is connected with the light-emitting control signal terminal EM. A first electrode of the seventh transistor T7 is connected with the initial signal terminal INT. A second electrode of the seventh transistor T7 is connected with the fourth node N4.

A control electrode of the eighth transistor T8 is connected with the second scanning signal terminal Gate N. A first electrode of the eighth transistor T8 is connected with the fifth node N5. A second electrode of the eighth transistor T8 is connected with the first node N1.

FIG. 6 shows an exemplary structure of the driving sub-circuit, the write sub-circuit, the compensation sub-circuit, the storage sub-circuit, the second light-emitting control sub-circuit, the first light-emitting control sub-circuit, the reset sub-circuit and the leak-proof sub-circuit. It is easy for those skilled in the art to understand that implementation modes of the above sub-circuits are not limited thereto as long as functions thereof can be implemented.

In an exemplary embodiment, the light-emitting element EL may be an Organic Light-emitting Diode (OLED) or a light-emitting diode of any other type.

In an exemplary embodiment, as shown in FIG. 6, each of the first transistor T1 to the sixth transistor T6 is a first-type transistor. Each of the seventh transistor T7 and the eighth transistor T8 is a second-type transistor. The first-type transistor and the second-type transistor are of different types of transistors.

In an exemplary embodiment, as shown in FIG. 6, the first-type transistors are P-type transistors. The second-type transistors are N-type transistors.

In an exemplary embodiment, the first-type transistors are Low Temperature Poly Silicon (LTPS) Thin Film Transistors (TFT). The second-type transistors are an Indium Gallium Zinc Oxide (IGZO) thin film transistors.

In this embodiment, an indium gallium zinc oxide thin film transistor generates a lower leak current than a low temperature poly silicon thin film transistor. Therefore, the eighth transistor T8 is configured to be an indium gallium zinc oxide thin film transistor, so that the leak current can be significantly reduced. The seventh transistor T7 is configured to be an indium gallium zinc oxide thin film transistor, and the control electrode of the seventh transistor T7 is connected with the light-emitting control signal terminal EM, so that the resetting/brightness adjustment of the light-emitting element can be implemented cyclically in a low-frequency refresh stage only by cyclically controlling the signal of the light-emitting control signal terminal EM rather than cyclically controlling the signals of the first scanning signal terminal Gate and the reset control signal terminal Re, so that brightness equalization is achieved. In addition, it is unnecessary to provide the first transistor T1 and the second transistor T2 as indium gallium zinc oxide thin film transistors. Since a size of a low temperature poly silicon thin film transistor is usually smaller than that of an indium gallium zinc oxide thin film transistor, the pixel circuit of the embodiment of the present disclosure occupies a relatively small space, which is conducive to improving the resolution of the display panel.

Figure 7:
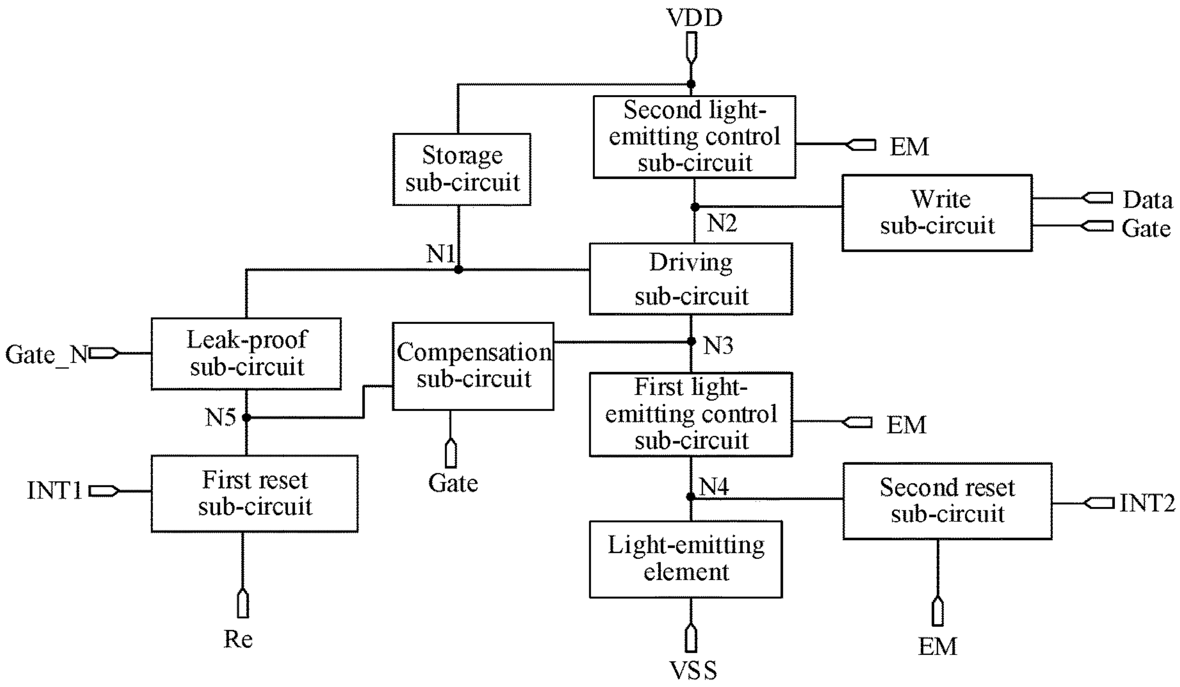
FIG. 7 is a schematic structural diagram of another pixel circuit according to an embodiment of the present disclosure.

In an exemplary embodiment, as shown in FIG. 7, the reset sub-circuit includes a first reset sub-circuit and a second reset sub-circuit. The initial signal terminal includes a first initial signal terminal INT1 and a second initial signal terminal INT2.

The first reset sub-circuit is connected with the reset control signal terminal Re, the first initial signal terminal INT1 and the fifth node N5 respectively, and is configured to write a signal of the first initial signal terminal INT1 to the fifth node N5 under the control of a signal of the reset control signal terminal Re.

The second reset sub-circuit is connected with the light-emitting control signal terminal EM, the second initial signal terminal INT2 and the fourth node N4 respectively, and is configured to write a signal of the second initial signal terminal INT2 into the fourth node N4 under the control of the signal of the light-emitting control signal terminal EM.

In this embodiment, the first reset sub-circuit initializes the fifth node N5 as the signal of the first initial signal terminal INT1, and the second reset sub-circuit initializes the fourth node N4 as the signal of the second initial signal terminal INT2. In this way, a reset voltage of the light-emitting element EL and a reset voltage of the first node N1 can be adjusted respectively. Therefore, a better display effect is achieved, and problems such as low-frequency flickering are improved.

Figure 8:
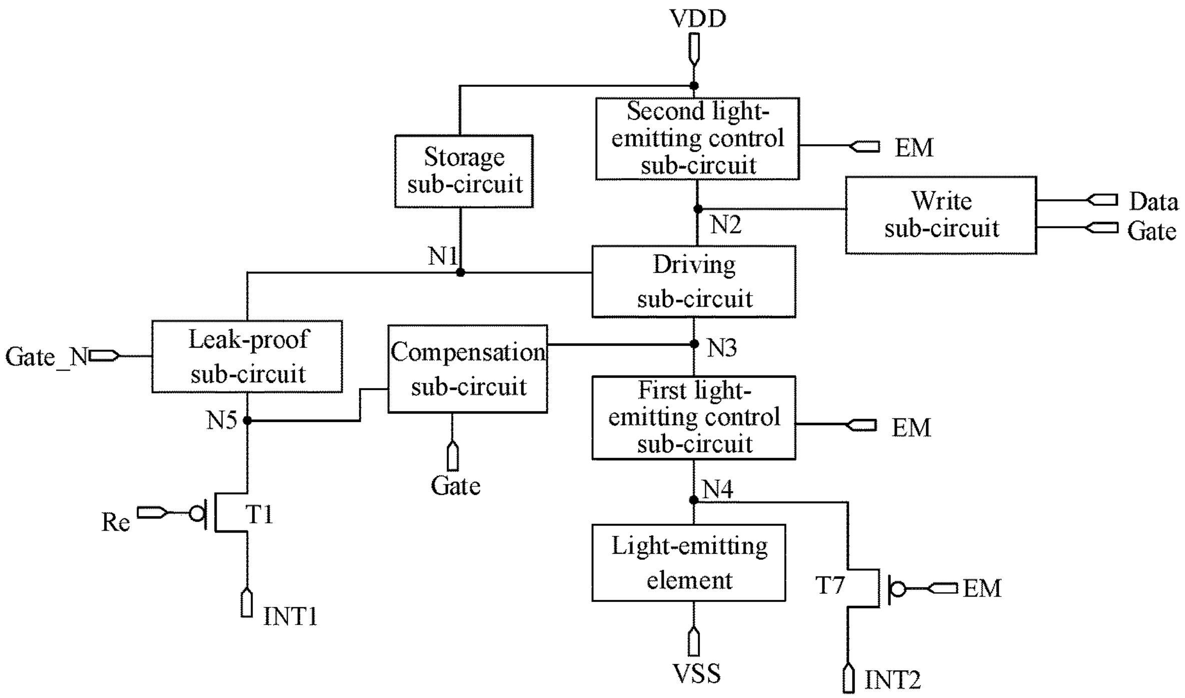
FIG. 8 is an equivalent circuit diagram of a first reset sub-circuit and a second reset sub-circuit according to an embodiment of the present disclosure.

In an exemplary embodiment, FIG. 8 is an equivalent circuit diagram of a first reset sub-circuit and a second reset sub-circuit according to an embodiment of the present disclosure. As shown in FIG. 8, the first reset sub-circuit provided in the embodiment of the present disclosure includes a first transistor T 1. The second reset sub-circuit includes a seventh transistor T7.

A control electrode of the first transistor T1 is connected with the reset control signal terminal Re. A first electrode of the first transistor T1 is connected with the first initial signal terminal INT1. A second electrode of the first transistor T1 is connected with the fifth node.

A control electrode of the seventh transistor T7 is connected with the light-emitting control signal terminal EM. A first electrode of the seventh transistor T7 is connected with the second initial signal terminal INT2. A second electrode of the seventh transistor T7 is connected with the fourth node N4.

FIG. 8 shows an exemplary structure of the first reset sub-circuit and the second reset sub-circuit. It is easy for those skilled in the art to understand that implementation modes of the first reset sub-circuit and the second reset sub-circuit are not limited thereto as long as functions thereof can be implemented.

In this embodiment, the first transistor T1 resets the fifth node, and the seventh transistor T7 resets the fourth node (i.e., an anode terminal of the light-emitting element EL). In this way, the first node N1 and the fourth node N4 have different reset voltages, and an effect of separate control is achieved.

In this embodiment, except the first reset sub-circuit and the second reset sub-circuit, structures of other sub-circuits (the driving sub-circuit, the write sub-circuit, the compensation sub-circuit, the storage sub-circuit, the second light-emitting control sub-circuit, the first light-emitting control sub-circuit and the leak-proof sub-circuit) may refer to the structures of the driving sub-circuit, the write sub-circuit, the compensation sub-circuit, the storage sub-circuit, the second light-emitting control sub-circuit, the first light-emitting control sub-circuit and the leak-proof sub-circuit in the above-mentioned embodiment, which will not be repeated herein.

In an exemplary embodiment, the pixel circuit further includes a gradient dimming module.

The gradient dimming module is configured to provide signals of multiple frequencies for multiple signal terminals, wherein the multiple signal terminals include at least one of the reset control signal terminal, the first scanning signal terminal, the light-emitting control signal terminal and the second scanning signal terminal.

In an exemplary embodiment, the gradient dimming module providing the signals of multiple frequencies for the multiple signal terminals includes:

when a display panel is in a second display mode, it is determined that a data refresh frequency of the pixel circuit is a second frequency, and a frequency of the signal of the light-emitting control signal terminal is a third frequency, wherein the third frequency is higher than the second frequency. The second display mode includes a refresh frame stage and a retention frame stage. The pixel circuit refreshes data in the refresh frame stage. A duty ratio of the signal of the light-emitting control signal terminal varies with time in the retention frame stage.

In an exemplary embodiment, when the display panel is in the second display mode, each of a frequency of a signal of the reset control signal terminal, a frequency of a signal of the first scanning signal terminal and a frequency of a signal of the second scanning signal terminal is the second frequency.

In an exemplary embodiment, the gradient dimming module providing the signals of multiple frequencies for the multiple signal terminals further includes:

- when the display panel is in a first display mode, it is determined that the data refresh frequency of the pixel circuit is a first frequency and each of the frequency of the signal of the reset control signal terminal, the frequency of the signal of the first scanning signal terminal, the frequency of the signal of the light-emitting control signal terminal and the frequency of the signal of the second scanning signal terminal is the first frequency, wherein the first frequency is higher than the second frequency.

In an exemplary embodiment, the first frequency may be equal to the third frequency.

Figure 9:
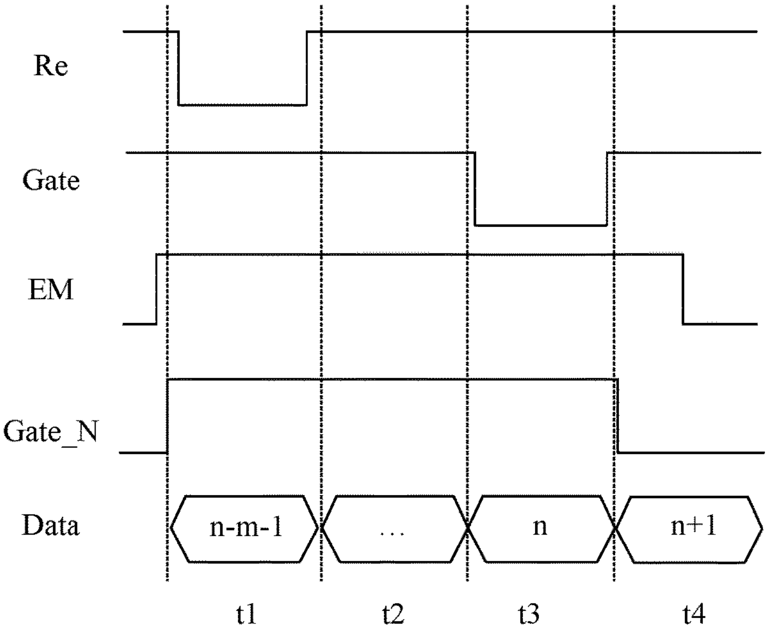
FIG. 9 is an operating timing diagram of a pixel circuit in a normal display mode according to an embodiment of the present disclosure.

A working process of a pixel circuit unit in a normal display mode within one frame cycle will be described below in detail in combination with the pixel circuit unit shown in FIG. 6 and the operating timing diagram shown in FIG. 9 by taking the condition that all of the first transistor T1 to the sixth transistor T6 in the pixel circuit provided in the embodiment of the present disclosure are P-type thin film transistors and both the seventh transistor T7 and the eighth transistor T8 are N-type thin film transistors as an example. As shown in FIG. 6, the pixel circuit provided in the embodiment of the present disclosure includes eighth transistor units (T1 to T8), one capacitor unit (C1), and four power supply terminals (VDD, VSS, Data, and INT). Among them, the first power supply voltage terminal VDD keeps providing a high-level signal. The second power supply voltage terminal VSS keeps providing a low-level signal. In an exemplary implementation mode, a working process of the pixel circuit in a normal display mode in a frame cycle includes:

In a first stage t1, which is referred to as a reset stage, signals of a first scanning signal terminal Gate, a second scanning signal terminal Gate N and a light-emitting control signal terminal EM are all high-level signals, and a signal of a reset control signal terminal Re is a low-level signal. The high-level signal of the light-emitting control signal terminal EM turns off the fifth transistor T5 and the sixth transistor T6 and turns on the seventh transistor T7. The high-level signal of the second scanning signal terminal Gate N turns on the eighth transistor T8. The low-level signal of the reset control signal terminal Re turns on the first transistor T 1. Therefore, voltages of a first node N1 and a fourth N4 are reset to an initial voltage provided by the initial voltage terminal Vinit to complete initialization. Then, a potential of the reset control signal terminal Re is set to be high, and the first transistor T1 is turned off. Since the fifth transistor T5 and the sixth transistor T6 are turned off, an light-emitting element EL does not emit light in this stage.

In a second stage t2 which is referred to as an adjustment stage, a timing sequence of each input signal terminal remains unchanged. This stage may include m scanning sub-cycles, wherein m is an integer greater than or equal to 0. A value of m is determined according to a specific condition. Each scanning sub-cycle corresponds to one grid line group. A display panel includes N grid line groups, wherein N is an integer larger than m. In an exemplary embodiment, the adjustment stage may be m times of on-time of each row of grid lines.

In this embodiment, time length of the second stage t2 may be adjusted to increase reset keeping time the first node N1 to improve a bias of the third transistor T3 caused by a data voltage.

In a third stage t3, which is referred to as a data write stage, the signal of the first scanning signal terminal Gate is a low-level signal, the fourth transistor T4 and the second transistor T2 are turned on, and the data signal terminal Data outputs a data voltage. In this stage, the first node N1 at is a low level, so that the third transistor T3 is turned on. The fourth transistor T4 and the second transistor T2 are turned on, so that the data voltage output by the data signal terminal Data is provided for the first node N1 through the turned-on fourth transistor T4, a second node N2, the turned-on third transistor T3, a third node N3, the turned-on second transistor T2 and the eighth transistor T8, and the first capacitor C1 is charged with a voltage difference between the data voltage output by the data signal terminal Data and a threshold voltage of the third transistor T3. A voltage of a second end (the first node N1) of the first capacitor C1 is Vdata-Vth, wherein Vdata is the data voltage output by the data signal terminal Data, and Vth is the threshold voltage of the third transistor T3. The signal of the light-emitting control signal terminal EM is a high-level signal, and the fifth transistor T5 and the sixth transistor T6 are turned off to ensure that the light-emitting element EL does not emit light.

In a fourth stage t4, which is referred to as a light-emitting stage, the signal of the first scanning signal terminal Gate is a high-level signal, and the signals of the light-emitting control signal terminal EM and the second scanning signal terminal Gate N are both low-level signals. The low-level signal of the light-emitting control signal terminal EM makes the seventh transistor T7 turns off and makes the fifth transistor T5 and the sixth transistor T6 turns on, and a power voltage output by the first power supply voltage terminal VDD provides a driving voltage for a first electrode (i.e., the fourth node N4) of the light-emitting element EL through the fifth transistor T5, the third transistor T3 and the sixth transistor T6 which are turned-on to drive the light-emitting element EL to emit light.

In a driving process of the pixel circuit, a driving current flowing through the third transistor T3 (i.e., a drive thin film transistor) is determined by a voltage difference between a gate electrode and first electrode of the third transistor T3. Since the voltage of the first node N1 is Vdata-Vth, the driving current of the third transistor T3 is:

$$I=K^*(Vgs-Vth)^2=K^*[(Vdd-V\text{data}+Vth)-Vth]^2=K^*[(Vdd-V\text{data})]^2$$

where I represents the driving current flowing through the third transistor T3, i.e., the driving current for driving the light-emitting element EL. K represents a constant. Vgs represents the voltage difference between the gate electrode and first electrode of the third transistor T3. Vth represents the threshold voltage of the third transistor T3. Vdata represents the data voltage output by the data signal terminal Data. Vdd represents the power voltage output by the first power supply voltage terminal VDD.

It can be seen from the above-mentioned formula that the current I flowing through the light-emitting element EL is unrelated to the threshold voltage Vth of the third transistor T3, so that the influence of the threshold voltage Vth of the third transistor T3 on the current I is eliminated, and brightness uniformity is ensured.

Based on the above-mentioned operating timing, the pixel circuit eliminates residual positive charges of the light-emitting element EL after last time of light emission, achieves a compensation for the gate voltage of the drive thin film transistor, avoids the influence of a threshold voltage drift of the drive thin film transistor on the driving current of the light-emitting element EL, so that the uniformity of display images and the display quality of the display panel are improved.

Figure 10:
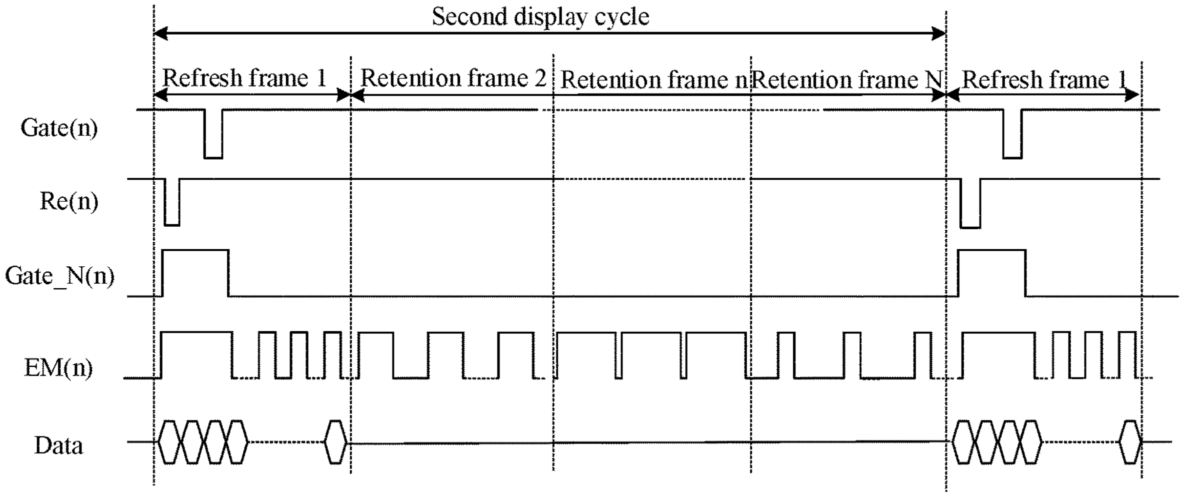
FIG. 10 is an operating timing diagram of a pixel circuit in a low-frequency display mode according to an embodiment of the present disclosure.

As shown in FIG. 10, in a low-frequency display mode, one display cycle is divided into one refresh frame and multiple retention frames. The refresh frame is a picture refresh frame, i.e., a data update frame. The retention frame holds the data. The data is locked at the first node N1 (the control electrode of the drive thin film transistor), and is not to be refreshed. However, in order to keep flickering invisible, the light-emitting element EL usually needs to be continuously reset to achieve a display frequency of 60 Hz or above. Therefore, in a retention frame stage, an anode of the light-emitting element EL may also be reset according to a frequency of 60 Hz or above, that is, the EM needs to be continuously refreshed. A duty ratio of the signal of the light-emitting control signal terminal EM may be adjusted (namely a pulse width of the signal of the light-emitting control signal terminal EM is adjusted, and a cycle of the signal of the light-emitting control signal terminal EM remains unchanged) to control the brightness of a display picture. In this embodiment, the duty ratio is defined as a light-emitting time length/light-emitting cycle, so as to describe the duty ratio and the brightness in direct proportion. Among them, one light-emitting cycle includes a sum of a light-emitting length time and a non-light-emitting time length. Since the fifth transistor T5 and sixth transistor T6 driven by the light-emitting control signal terminal EM are both P-channel Metal Oxide Semiconductor (PMOS) TFTs, the light-emitting element EL emits light when the signal of the light-emitting control signal terminal EM is at a low level, and the light-emitting element EL is turned off when the signal of the light-emitting control signal terminal EM is at a high level. Therefore, the duty ratio is a ratio of time length when the light-emitting control signal terminal EM outputs a low-level voltage to a signal cycle of the light-emitting control signal terminal EM. If the ratio is lower, on-time of the light-emitting element EL is shorter and brightness is lower in a unit cycle.

As shown in FIG. 10, the first scanning signal terminal Gate, the second scanning signal terminal Gate N, the reset control signal terminal Re and the data signal terminal Data are in cooperation for use of low-frequency refresh, and pixels of a refresh frame are refreshed only row by row. The light-emitting control signal terminal EM is still refreshed row by row according to 60 Hz or 120 Hz, thereby implementing the high-frequency refresh of the light-emitting element EL and alleviating the flickering caused by brightness differences of the light-emitting element EL at data refresh moments. The duty ratio of the signal of the light-emitting control signal EM may vary dynamically in a retention frame stage so as to achieve effects of gradient brightness decrease and gradient brightness increase. In such case, the first scanning signal terminal Gate keeps outputting high-level signals. The signal of the reset control signal terminal Re is driven by a signal of an (n−m−1)-th row of the first scanning signal terminal Gate, that is, the signal of the first scanning signal terminal Gate and the signal of the reset control signal terminal Re are both kept at a low frequency, so that a Gate On Array (GOA) of the first scanning signal terminal Gate is not refreshed, and the power consumption can be reduced.

Figure 11:
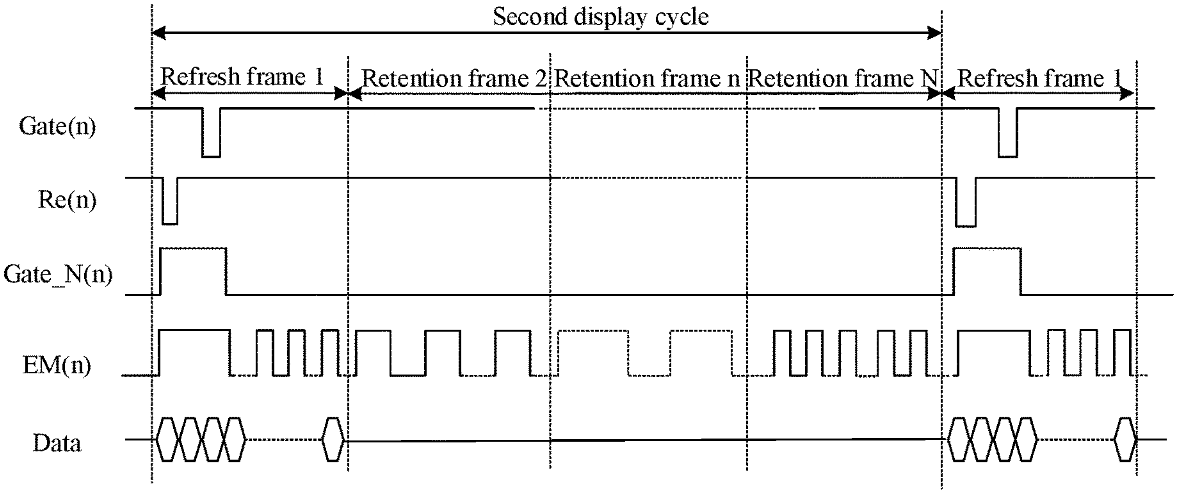
FIG. 11 is another operating timing diagram of a pixel circuit in a low-frequency display mode according to an embodiment of the present disclosure.

In an exemplary embodiment, as shown in FIG. 11, in the retention frame stage, a frequency of the signal of the light-emitting control signal EM may be adjusted (namely both the frequency and the pulse width of the signal of the light-emitting control signal EM are varied in different retention frames) to further control brightness variations of the display picture to achieve the effects of gradient brightness decrease and gradient brightness increase.

Figure 12:
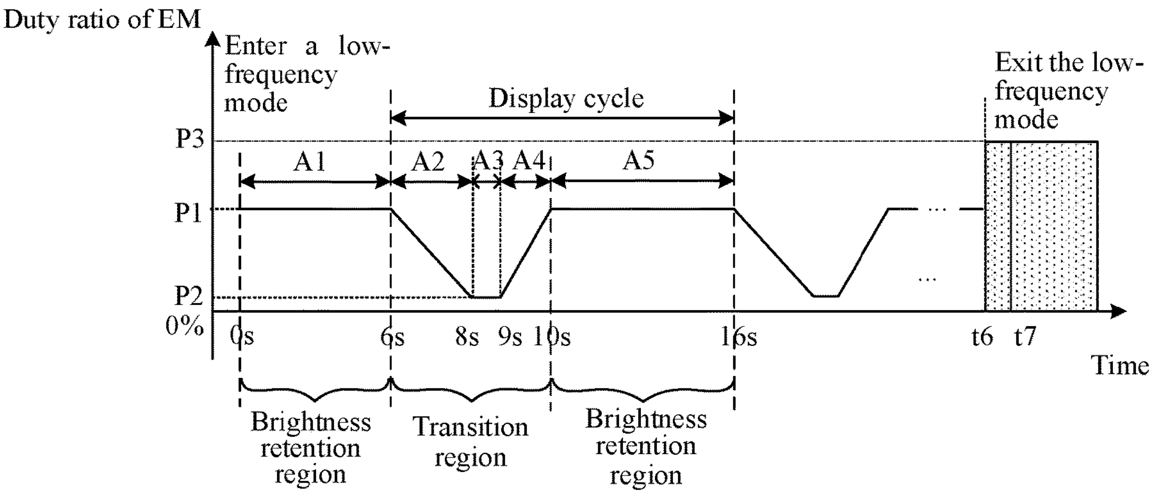
FIG. 12 is a schematic diagram of variation of a duty ratio of a signal at a light-emitting control signal terminal of a pixel circuit in a low-frequency display mode according to an embodiment of the present disclosure.

FIG. 12 is a schematic diagram of setting of a duty ratio of a signal of a light-emitting control signal terminal EM after entering a low-frequency mode. In the low-frequency mode, one display cycle includes a first brightness retention region A1 (or A5), a brightness decrease region A2, a second brightness retention region A3, and a brightness increase region A4. Among them, the brightness decrease region A2, the second brightness retention region A3 and the brightness increase region A4 are collectively referred to as a transition region. Exemplarily, taking a data refresh frequency of 0.1 Hz in the low-frequency mode, one display cycle is 10 s. The first brightness region A1 (or A5) occupies 6 s, and in the transition region, the brightness decrease region A2 occupies 2 s, the second brightness retention region A3 occupies 1 s, and the brightness increase region A4 occupies 1 s. A data refresh moment may be located in any one of the brightness decrease region A2, the second brightness retention region A3 and the brightness increase region A4 (namely a refresh frame 1 in FIG. 10 may be located in any one of the brightness decrease region A2, the second brightness retention region A3 and the brightness increase region A4). Exemplarily, the data refresh moment may be located in the second brightness retention region A3. In such case, data refresh is performed under minimum brightness so as to avoid a sudden change of the brightness of the light-emitting element at the data refresh moment, which discomforts eyes. As shown in FIG. 10, when the display frequency is 60 Hz, $\frac{1}{60}$ s may be used for updating data (a timing sequence includes the above-mentioned reset stage, data write stage, light-emitting stage, etc.), and the remaining $\frac{59}{60}$ s may be used for holding data (timing sequences include sequentially repeated light-emitting stages and off stages), namely timing sequences of control signals in the remaining $\frac{59}{60}$ s are the same as those of the control signals in the retention frame stage. In the 60 Hz mode, the duty ratio of the signal of the light-emitting control signal terminal EM may vary row by row in the transition region. In the brightness decrease region A2, the duty ratio of the signal of the light-emitting control signal terminal EM may decrease row by row or frame by frame, and the brightness of the light-emitting element EL decreases row by row or frame by frame. In the brightness increase region A4, the duty ratio of the signal of the light-emitting control signal terminal EM may increase row by row or frame by frame, and the brightness of the light-emitting element EL increases row by row or frame by frame. In order to ensure a more natural smooth transition, time length of the brightness decrease region A2 and the brightness increase region A4 may further be prolonged to make the brightness variation of the light-emitting element EL smoother. Exemplarily, in an AOD mode, time is mainly displayed, and a minimum display unit is usually minute. In such case, a picture may be updated per minute by this method.

In addition, when a host needs to update a picture (for example, there is a new message required to be displayed), the brightness may be decreased immediately in the brightness retention region to enter the transition region, thereby refreshing data. After the refreshing is completed, the brightness is recovered. The brightness usually needs not to be adjusted to the maximum in the low-frequency mode, namely the duty ratio P1 of the EM is lower than 100%, such as 90%, 80%, 70%, 60%, 50%, 40%, 30%, and 20%. Meanwhile, a duty ratio P2 may be selected according to a practical condition under low brightness. P2 is greater than or equal to 0%, such as 5%, 10%, 15%, 20%, 30%, and 40%.

The pixel circuit of the embodiment of the present disclosure achieves data refresh by gradually changing the brightness in the AOD or low-frequency mode so as to avoid a sudden change of the brightness at a data refresh moment, which discomforts eyes.

According to the pixel circuit of the embodiment of the present disclosure, the duty ratio may be minimized during data refresh may be adjusted to the minimum by Pulse Width Modulation (PWM) adjustment over the signal of the light-emitting control signal terminal EM, so that picture switching is replaced with manual control over the brightness, and the problem of picture refresh jitters caused by keeping brightness differences for long is solved. According to the pixel circuit of the embodiment of the present disclosure, the data update cycle T needs not to be restricted because of the problem of picture flickering, and the current low frequency of 1 Hz may be reduced to 0.1 Hz or a lower data refresh frequency under which a picture may also be refreshed without flickering.

An embodiment of the present disclosure further provide a method for driving a pixel circuit, which is applied to the pixel circuit provided in the above-mentioned embodiment and the method includes:

When a display panel is in a second display mode, it is determined that a data refresh frequency of the pixel circuit is a second frequency and a frequency of a signal of the light-emitting control signal terminal is a third frequency, wherein the third frequency is higher than the second frequency.

The second display mode includes a refresh frame stage and a retention frame stage. The pixel circuit refreshes data in the refresh frame stage. A duty ratio of the signal of the light-emitting control signal terminal varies with time in the retention frame stage.

In an exemplary embodiment, when the display panel is in the second display mode, each of a frequency of a signal of the reset control signal terminal, a frequency of a signal of the first scanning signal terminal and a frequency of a signal of the second scanning signal terminal is the second frequency.

In an exemplary embodiment, the driving method further includes that: when the display panel is in a first display mode, it is determined that the data refresh frequency of the pixel circuit is a first frequency and each of the frequency of the signal of the reset control signal terminal, the frequency of the signal of the first scanning signal terminal, the frequency of the signal of the light-emitting control signal terminal and the frequency of the signal of the second scanning signal terminal is a first frequency, wherein the first frequency is higher than the second frequency.

In an exemplary embodiment, the first display mode may be a normal display mode, and the second display mode may be a low-frequency display mode or an AOD mode.

In an exemplary embodiment, the first frequency may be 60 Hz or 120 Hz. The second frequency may be 1 Hz or 0.1 Hz. The third frequency may be 60 Hz or 120 Hz.

In an exemplary embodiment, the pixel circuit includes a driving sub-circuit, a write sub-circuit, a compensation sub-circuit, a storage sub-circuit, a reset sub-circuit, a first light-emitting control sub-circuit, a second light-emitting control sub-circuit, a leak-proof sub-circuit, a light-emitting element, a first scanning signal terminal, a second scanning signal terminal, a light-emitting control signal terminal, an initial signal terminal, a data signal terminal, a first voltage terminal, and a second voltage terminal. The first display mode includes multiple first display cycles. The first display cycle includes a reset stage, a data write stage, and a light-emitting stage.

In the reset stage, the reset sub-circuit resets the fourth node under the control of the signal of the light-emitting control signal terminal and resets the fifth node under the control of the signal of the reset control signal terminal, and the leak-proof sub-circuit writes a signal of the fifth node into the first node under the control of the signal of the second scanning signal terminal.

In the data write stage, the write sub-circuit writes a signal of the data signal terminal to the second node under the control of the signal of the first scanning signal terminal, the compensation sub-circuit compensates a threshold voltage of the driving sub-circuit to the fifth node under the control of the signal of the first scanning signal terminal, the leak-proof sub-circuit writes the signal of the fifth node into the first node under the control of the signal of the second scanning signal terminal, and the storage sub-circuit stores a voltage of a control terminal of the driving sub-circuit.

In the light-emitting stage, the second light-emitting control sub-circuit forms a path between the first voltage terminal and the second node under the control of the signal of the light-emitting control signal terminal, the driving sub-circuit provides a driving current for the third node under the control of signals of the first node and the second node, and the first light-emitting control sub-circuit forms a path between the third node and the fourth node under the control of the signal of the light-emitting control signal terminal.

In this step, the reset sub-circuit resets the fourth node and the fifth node, and the leak-proof sub-circuit writes the signal of the fifth node into the first node, so that a voltage of an anode terminal of the light-emitting element and a voltage of a control terminal of the driving sub-circuit are reset, and residual positive charges of the light-emitting element after last time of light emission and residual charges in a storage capacitor are eliminated. The compensation sub-circuit compensates the threshold voltage of the fifth node, and the leak-proof sub-circuit writes the signal of the fifth node into the first node, so that the compensation for the threshold voltage of the driving sub-circuit is achieved, and uniformity of a display image is improved.

In an exemplary embodiment, the first display cycle further includes an adjustment stage. A time length of the adjustment stage is m scanning sub-cycles. Each scanning sub-cycle corresponds to one grid line group. The display panel includes N grid line groups, wherein m is an integer greater than or equal to 0, and N is an integer larger than m.

In the adjustment stage, the reset sub-circuit resets the fourth node under the control of the signal of the light-emitting control signal terminal, and the leak-proof sub-circuit writes the signal of the fifth node into the first node under the control of the signal of the second scanning signal terminal.

In this embodiment, the time length of the adjustment stage may be adjusted to increase reset keeping time of the first node N1 to improve a bias of the driving sub-circuit (the third transistor T3) caused by a data voltage.

In an exemplary embodiment, the second display mode includes multiple second display cycles. The second display cycle includes a first brightness retention stage, a brightness decrease stage and a brightness increase stage. One of the brightness decrease stage and the brightness increase stage sequentially includes the reset stage, the data write stage and the light-emitting stage, while the other one of the brightness decrease stage and the brightness increase stage includes multiple light-emitting stages and multiple off stages, wherein the light-emitting stages and the off stages are spaced from each other.

In the reset stage, the reset sub-circuit resets the fourth node under the control of the signal of the light-emitting control signal terminal and resets the fifth node under the control of the signal of the reset control signal terminal, and the leak-proof sub-circuit writes a signal of the fifth node into the first node under the control of the signal of the second scanning signal terminal.

In the data write stage, the write sub-circuit writes the signal of the data signal terminal into the second node under the control of the signal of the first scanning signal terminal, the compensation sub-circuit compensates a threshold voltage of the driving sub-circuit to the fifth node under the control of the signal of the first scanning signal terminal, the leak-proof sub-circuit writes the signal of the fifth node into the first node under the control of the signal of the second scanning signal terminal, and the storage sub-circuit stores a voltage of the control terminal of the driving sub-circuit.

In the light-emitting stage, the second light-emitting control sub-circuit forms a path between the first voltage terminal and the second node under the control of the signal of the light-emitting control signal terminal, the driving sub-circuit provides a driving current for the third node under the control of the signals of the first node and the second node, and the first light-emitting control sub-circuit forms a path between the third node and the fourth node under the control of the signal of the light-emitting control signal terminal.

In the off stage, the second light-emitting control sub-circuit breaks the path between the first voltage terminal and the second node under the control of the signal of the light-emitting control signal terminal, and the first light-emitting control sub-circuit cuts off the path between the third node and the fourth node under the control of the signal of the light-emitting control signal terminal.

In an exemplary embodiment, one of the brightness decrease stage and the brightness increase stage may further include an adjustment stage between the reset stage and the data write data. Time length of the adjustment stage is a scanning cycle for m rows, wherein m is an integer greater than or equal to 0.

In the adjustment stage, the reset sub-circuit resets the fourth node under the control of the signal of the light-emitting control signal terminal, and the leak-proof sub-circuit writes the signal of the fifth node into the first node under the control of the signal of the second scanning signal terminal.

In an exemplary embodiment, besides the reset stage, the data write stage and the light-emitting stage above-mentioned, one of the brightness decrease stage and the brightness increase stage further includes multiple light-emitting stages and multiple off stages, wherein the light-emitting stages and the off stages are spaced from each other.

In an exemplary embodiment, a duty ratio of the light-emitting control signal decreases row by row or frame by frame in the brightness decrease stage. The duty ratio of the light-emitting control signal remains unchanged in the first brightness retention stage. The duty ratio of the light-emitting control signal increases row by row or frame by frame in the brightness increase stage.

In another exemplary embodiment, the second display mode includes multiple second display cycles. The second display cycle includes a first brightness retention stage, a brightness decrease stage, a second brightness retention stage and a brightness increase stage. Brightness of the light-emitting element in the first brightness retention stage is higher than that of the light-emitting element in the second brightness retention stage. One of the brightness decrease stage, the second brightness retention stage and the brightness increase stage sequentially includes the reset stage, the data write stage and the light-emitting stage, and each of the other two stages and the first retention stage includes multiple light-emitting stages and multiple off stages, wherein the light-emitting stages and the off stages are spaced from each other.

In the reset stage, the reset sub-circuit resets the fourth node under the control of the signal of the light-emitting control signal terminal and resets the fifth node under the control of the signal of the reset control signal terminal, and the leak-proof sub-circuit writes the signal of the fifth node into the first node under the control of the signal of the second scanning signal terminal.

In the data write stage, the write sub-circuit writes the signal of the data signal terminal into the second node under the control of the signal of the first scanning signal terminal, the compensation sub-circuit compensates a threshold voltage of the driving sub-circuit to the fifth node under the control of the signal of the first scanning signal terminal, the leak-proof sub-circuit writes the signal of the fifth node into the first node under the control of the signal of the second scanning signal terminal, and the storage sub-circuit stores a voltage of the control terminal of the driving sub-circuit.

In the light-emitting stage, the second light-emitting control sub-circuit forms a path between the first voltage terminal and the second node under the control of the signal of the light-emitting control signal terminal, the driving sub-circuit provides a driving current for the third node under the control of the signals of the first node and the second node, and the first light-emitting control sub-circuit forms a path between the third node and the fourth node under the control of the signal of the light-emitting control signal terminal.

In the off stage, the second light-emitting control sub-circuit cuts off the path between the first voltage terminal and the second node under the control of the signal of the light-emitting control signal terminal, and the first light-emitting control sub-circuit cuts off the path between the third node and the fourth node under the control of the signal of the light-emitting control signal terminal.

In an exemplary embodiment, one of the brightness decrease stage, the second brightness retention stage and the brightness increase stage further includes multiple light-emitting stages and multiple off stages besides the reset stage, the data write stage and the light-emitting stage above-mentioned, the light-emitting stages and the off stages being spaced.

In an exemplary embodiment, a duty ratio of the light-emitting control signal decreases row by row or frame by frame in the brightness decrease stage. The duty ratio of the light-emitting control signal is equal to a first duty ratio in the first brightness retention stage. The duty ratio of the light-emitting control signal is equal to a second duty ratio in the second brightness retention stage, wherein the first duty ratio is higher than the second duty ratio. The duty ratio of the light-emitting control signal increases row by row or frame by frame in the brightness increase stage.

An embodiment of the present disclosure further provides a display apparatus, which includes the pixel circuit provided in the above-mentioned embodiment. The display apparatus of the present disclosure may be any product or component with a display function, such as a mobile phone, a tablet computer, a television, a display, a laptop computer, a digital photo frame, or a navigator. In an exemplary implementation mode, the display apparatus may be a wearable display apparatus that may be worn on a human body in some manners, such as a smart watch, a smart band, etc.

Figure 13:
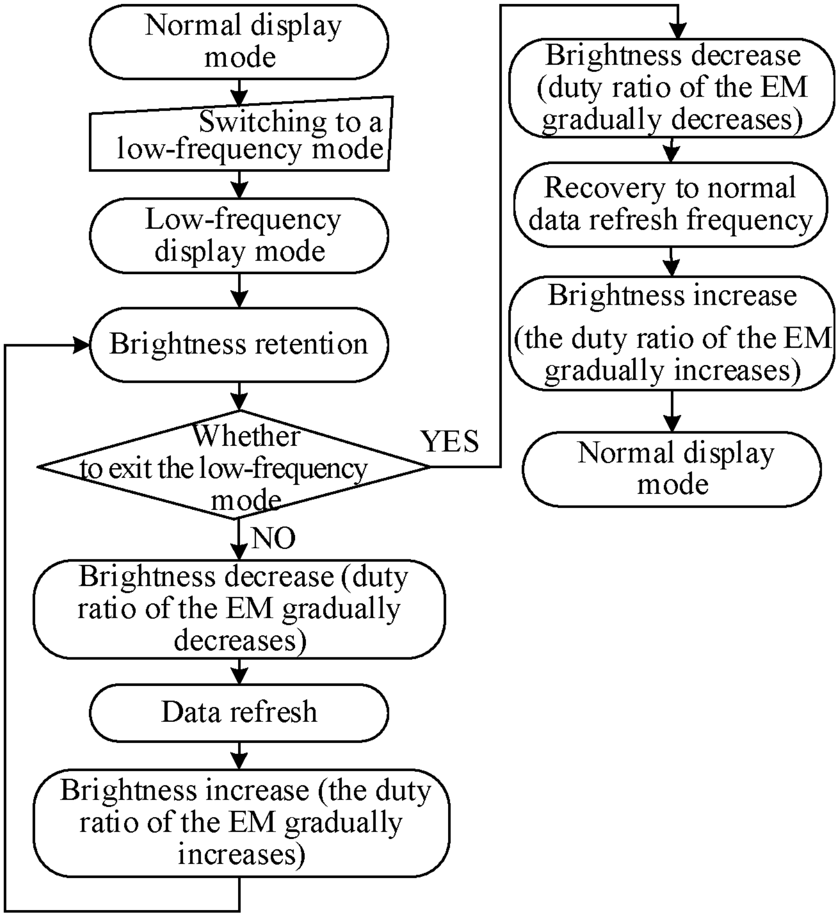
FIG. 13 is a schematic diagram of mode switching of a display apparatus according to an embodiment of the present disclosure.

In an exemplary embodiment, as shown in FIG. 13, when the display apparatus is switched from a normal display mode to a low-frequency display mode, it enters a first brightness retention stage at first. Then, whether it is necessary to exit the low-frequency display mode is checked, wherein if it is necessary to exit the low-frequency display mode, screen brightness is reduced frame by frame to recover a normal data refresh frequency, and the screen brightness is increased frame by frame to enter the normal display mode. If it is unnecessary to exit the low-frequency display mode, the display apparatus sequentially enters a brightness decrease stage, a second brightness retention stage (data refresh is performed in the second brightness retention stage) and a brightness increase stage, and then enters the first brightness retention stage to repeat the above-mentioned cyclic process.

The following points need to be noted.

The drawings of the embodiments of the present disclosure only involve structures involved in the embodiments of the present disclosure, and the other structures may refer to conventional designs.

The embodiments in the present disclosure, i.e., the features in the embodiments, may be combined to obtain new embodiments if there is no conflict.

Although the implementation modes of the present disclosure are disclosed above, the contents are only implementation modes used for ease of understanding of the present disclosure and are not intended to limit the present disclosure. Those skilled in the art may make any modification and variation to implementation forms and details without departing from the spirit and scope disclosed in the present disclosure. However, the patent protection scope of the present disclosure is still subject to the scope defined by the appended claims.

The invention claimed is:

1. A pixel circuit, comprising a driving sub-circuit, a write sub-circuit, a compensation sub-circuit, a reset sub-circuit, a first light-emitting control sub-circuit, a second light-emitting control sub-circuit, a leak-proof sub-circuit, a storage sub-circuit, a frequency adjustment module, and a light-emitting element, wherein the driving sub-circuit is connected with a first node, a second node and a third node respectively, and is configured to provide a driving current for the third node under control of signals of the first node and the second node;

the write sub-circuit is connected with a first scanning signal terminal, a data signal terminal and the second node respectively, and is configured to write a signal of the data signal terminal into the second node under control of a signal of the first scanning signal terminal;

the compensation sub-circuit is connected with the first scanning signal terminal, the third node and a fifth node respectively, and is configured to compensate a threshold voltage of the driving sub-circuit to the fifth node under control of the signal of the first scanning signal terminal;

the leak-proof sub-circuit is connected with a second scanning signal terminal, the first node and the fifth node respectively, and is configured to write a signal of the fifth node into the first node under control of a signal of the second scanning signal terminal;

the storage sub-circuit is connected with a first voltage terminal and the first node respectively, and is configured to store a voltage of a control terminal of the driving sub-circuit;

the reset sub-circuit is connected with a reset control signal terminal, a light-emitting control signal terminal, an initial signal terminal, a fourth node and the fifth node respectively, and is configured to reset the fourth node under control of a signal of the light-emitting control signal terminal and reset the fifth node under control of a signal of the reset control signal terminal;

the second light-emitting control sub-circuit is connected with the first voltage terminal, the light-emitting control signal terminal and the second node respectively, and is configured to form a path between the first voltage terminal and the second node under the control of the signal of the light-emitting control signal terminal;

the first light-emitting control sub-circuit is connected with the light-emitting control signal terminal, the third node and the fourth node respectively, and is configured to form a path between the third node and the fourth node under the control of the signal of the light-emitting control signal terminal;

the frequency adjustment module is configured to provide signals of a plurality of frequencies for a plurality of signal terminals, the plurality of signal terminals comprise at least one of the reset control signal terminal, the first scanning signal terminal, the light-emitting control signal terminal and the second scanning signal terminal; and one end of the light-emitting element is connected with the fourth node, and the other end of the light-emitting element is connected with a second voltage terminal;

wherein the frequency adjustment module providing the signals of the plurality of frequencies for the plurality of signal terminals comprises:

when a display panel is in a second display mode, a data refresh frequency of the pixel circuit is a second frequency, and a frequency of the signal of the light-emitting control signal terminal is a third frequency, the third frequency is higher than the second frequency, wherein the second display mode comprises a refresh frame stage and a retention frame stage, the pixel circuit refreshes data in the refresh frame stage, and a duty ratio of the signal of the light-emitting control signal terminal varies with time in the retention frame stage.

2. The pixel circuit according to claim 1, wherein the compensation sub-circuit comprises a second transistor, the storage sub-circuit comprises a first capacitor, the driving sub-circuit comprises a third transistor, and the write sub-circuit comprises a fourth transistor;

a control electrode of the second transistor is connected with the first scanning signal terminal, a first electrode of the second transistor is connected with the third node, and a second electrode of the second transistor is connected with the fifth node;

one end of the first capacitor is connected with the first node, and the other end of the first capacitor is connected with the first voltage terminal;

a control electrode of the third transistor is connected with the first node, a first electrode of the third transistor is connected with the second node, and a second electrode of the third transistor is connected with the third node; and a control electrode of the fourth transistor is connected with the first scanning signal terminal, a first electrode of the fourth transistor is connected with the data signal terminal, and a second electrode of the fourth transistor is connected with the second node.

3. The pixel circuit according to claim 1, wherein the second light-emitting control sub-circuit comprises a fifth transistor, and the first light-emitting control sub-circuit comprises a sixth transistor;

a control electrode of the fifth transistor is connected with the light-emitting control signal terminal, a first electrode of the fifth transistor is connected with the first voltage terminal, and a second electrode of the fifth transistor is connected with the second node; and a control electrode of the sixth transistor is connected with the light-emitting control signal terminal, a first electrode of the sixth transistor is connected with the third node, and a second electrode of the sixth transistor is connected with the fourth node.

4. The pixel circuit according to claim 1, wherein the reset sub-circuit comprises a first transistor and a seventh transistor, and the leak-proof sub-circuit comprises an eighth transistor;

a control electrode of the first transistor is connected with the reset control signal terminal, a first electrode of the first transistor is connected with the initial signal terminal, and a second electrode of the first transistor is connected with the fifth node;

a control electrode of the seventh transistor is connected with the light-emitting control signal terminal, a first electrode of the seventh transistor is connected with the initial signal terminal, and a second electrode of the seventh transistor is connected with the fourth node; and a control electrode of the eighth transistor is connected with the second scanning signal terminal, a first electrode of the eighth transistor is connected with the fifth node, and a second electrode of the eighth transistor is connected with the first node.

5. The pixel circuit according to claim 1, wherein the compensation sub-circuit comprises a second transistor, the storage sub-circuit comprises a first capacitor, the driving sub-circuit comprises a third transistor, the write sub-circuit comprises a fourth transistor, the second light-emitting control sub-circuit comprises a fifth transistor, the first light-emitting control sub-circuit comprises a sixth transistor, the reset sub-circuit comprises a first transistor and a seventh transistor, and the leak-proof sub-circuit comprises an eighth transistor;

a control electrode of the second transistor is connected with the first scanning signal terminal, a first electrode of the second transistor is connected with the third node, and a second electrode of the second transistor is connected with the fifth node;

one end of the first capacitor is connected with the first node, and the other end of the first capacitor is connected with the first voltage terminal;

a control electrode of the third transistor is connected with the first node, a first electrode of the third transistor is connected with the second node, and a second electrode of the third transistor is connected with the third node;

a control electrode of the fourth transistor is connected with the first scanning signal terminal, a first electrode of the fourth transistor is connected with the data signal terminal, and a second electrode of the fourth transistor is connected with the second node;

a control electrode of the fifth transistor is connected with the light-emitting control signal terminal, a first electrode of the fifth transistor is connected with the first voltage terminal, and a second electrode of the fifth transistor is connected with the second node;

a control electrode of the sixth transistor is connected with the light-emitting control signal terminal, a first electrode of the sixth transistor is connected with the third node, and a second electrode of the sixth transistor is connected with the fourth node;

a control electrode of the first transistor is connected with the reset control signal terminal, a first electrode of the first transistor is connected with the initial signal terminal, and a second electrode of the first transistor is connected with the fifth node;

a control electrode of the seventh transistor is connected with the light-emitting control signal terminal, a first electrode of the seventh transistor is connected with the initial signal terminal, and a second electrode of the seventh transistor is connected with the fourth node;

a control electrode of the eighth transistor is connected with the second scanning signal terminal, a first electrode of the eighth transistor is connected with the fifth node, and a second electrode of the eighth transistor is connected with the first node; and each of the first transistor to the sixth transistor is a P-type transistor, and each of the seventh transistor and the eighth transistor is an N-type transistor.

6. The pixel circuit according to claim 1, wherein the reset sub-circuit comprises a first reset sub-circuit and a second reset sub-circuit, and the initial signal terminal comprises a first initial signal terminal and a second initial signal terminal;

wherein the first reset sub-circuit is connected with the reset control signal terminal, the first initial signal terminal and the fifth node respectively, and is configured to write a signal of the first initial signal terminal into the fifth node under the control of the signal of the reset control signal terminal; and the second reset sub-circuit is connected with the light-emitting control signal terminal, the second initial signal terminal and the fourth node respectively, and is configured to write a signal of the second initial signal terminal into the fourth node under the control of the signal of the light-emitting control signal terminal.

7. The pixel circuit according to claim 6, wherein the first reset sub-circuit comprises a first transistor, and the second reset sub-circuit comprises a seventh transistor;

a control electrode of the first transistor is connected with the reset control signal terminal, a first electrode of the first transistor is connected with the first initial signal terminal, and a second electrode of the first transistor is connected with the fifth node; and a control electrode of the seventh transistor is connected with the light-emitting control signal terminal, a first electrode of the seventh transistor is connected with the second initial signal terminal, and a second electrode of the seventh transistor is connected with the fourth node.

8. The pixel circuit according to claim 1, wherein when the display panel is in the second display mode, each of a frequency of the signal of the reset control signal terminal, a frequency of the signal of the first scanning signal terminal and a frequency of the signal of the second scanning signal terminal is the second frequency.

9. A display apparatus, comprising the pixel circuit according to claim 1.

10. A method for driving a pixel circuit, used for driving the pixel circuit according to claim 1 and comprising:

when a display panel is in a second display mode, determining that a data refresh frequency of the pixel circuit is a second frequency and a frequency of a signal of the light-emitting control signal terminal is a third frequency, wherein the third frequency is higher than the second frequency; and the second display mode comprises a refresh frame stage and a retention frame stage, the pixel circuit refreshes data in the refresh frame stage, and a duty ratio of the signal of the light-emitting control signal terminal varies with time in the retention frame stage.

11. The method according to claim 10, wherein when the display panel is in the second display mode, each of a frequency of the signal of the reset control signal terminal, a frequency of the signal of the first scanning signal terminal and a frequency of the signal of the second scanning signal terminal is the second frequency.

12. The method according to claim 10, further comprising: when the display panel is in a first display mode, determining that the data refresh frequency of the pixel circuit is a first frequency and each of a frequency of the signal of the reset control signal terminal, a frequency of the signal of the first scanning signal terminal, a frequency of the signal of the light-emitting control signal terminal and a frequency of the signal of the second scanning signal terminal is the first frequency, and the first frequency is higher than the second frequency.

13. The method according to claim 12, wherein the first display mode comprises a plurality of first display cycles, and a first display cycle comprises a reset stage, a data write stage and a light-emitting stage;

in the reset stage, the reset sub-circuit resets the fourth node under the control of the signal of the light-emitting control signal terminal and resets the fifth node under the control of the signal of the reset control signal terminal, and the leak-proof sub-circuit writes the signal of the fifth node to the first node under the control of the signal of the second scanning signal terminal;

in the data write stage, the write sub-circuit writes the signal of the data signal terminal into the second node under the control of the signal of the first scanning signal terminal, the compensation sub-circuit compensates the threshold voltage of the driving sub-circuit to the fifth node under the control of the signal of the first scanning signal terminal, the leak-proof sub-circuit writes the signal of the fifth node into the first node under the control of the signal of the second scanning signal terminal, and the storage sub-circuit stores the voltage of the control terminal of the driving sub-circuit; and in a light-emitting stage, the second light-emitting control sub-circuit forms a path between the first voltage terminal and the second node under the control of the signal of the light-emitting control signal terminal, the driving sub-circuit provides a driving current for the third node under the control of the signals of the first node and the second node, and the first light-emitting control sub-circuit forms a path between the third node and the fourth node under the control of the signal of the light-emitting control signal terminal.

14. The method according to claim 13, wherein the first display cycle further comprises an adjustment stage, a time length of the adjustment stage is m scanning sub-cycles, each scanning sub-cycle corresponds to one grid line group, and the display panel comprises N grid line groups, m is an integer greater than or equal to 0, and N is an integer greater than m; and in the adjustment stage, the reset sub-circuit resets the fourth node under the control of the signal of the light-emitting control signal terminal, and the leak-proof sub-circuit writes the signal of the fifth node into the first node under the control of the signal of the second scanning signal terminal.

15. The method according to claim 13, wherein the second display mode comprises a plurality of second display cycles, the second display cycle comprises a first brightness retention stage, a brightness decrease stage and a brightness increase stage, one of the brightness decrease stage and the brightness increase stage sequentially comprises the reset stage, the data write stage and the light-emitting stage, and the other of the brightness decrease stage and the brightness increase stage comprises a plurality of light-emitting stages and a plurality of off stages, wherein the light-emitting stages and the off stages are spaced from each other; and in an off stage, the second light-emitting control sub-circuit cuts off the path between the first voltage terminal and the second node under the control of the signal of the light-emitting control signal terminal, and the first light-emitting control sub-circuit cuts off the path between the third node and the fourth node under the control of the signal of the light-emitting control signal terminal; and wherein one of the brightness decrease stage and the brightness increase stage further comprises a plurality of light-emitting stages and a plurality of off stages, and the light-emitting stages and the off stages are spaced from each other.

16. The method according to claim 15, wherein a duty ratio of the light-emitting control signal decreases row by row or frame by frame in the brightness decrease stage, the duty ratio of the light-emitting control signal remains unchanged in the first brightness retention stage, and the duty ratio of the light-emitting control signal increases row by row or frame by frame in the brightness increase stage.

17. The method according to claim 13, wherein the second display mode comprises a plurality of second display cycles, a second display cycle comprises a first brightness retention stage, a brightness decrease stage, a second brightness retention stage and a brightness increase stage, brightness of the light-emitting element in the first brightness retention stage is higher than brightness of the light-emitting element in the second brightness retention stage, one of the brightness decrease stage, the second brightness retention stage and the brightness increase stage sequentially comprises the reset stage, the data write stage and the light-emitting stage, and each of the other two stages and the first retention stage comprises a plurality of light-emitting stages and a plurality of off stages, wherein the light-emitting stages and the off stages are spaced from each other; and in an off stage, the second light-emitting control sub-circuit cuts off the path between the first voltage terminal and the second node under the control of the signal of the light-emitting control signal terminal, and the first light-emitting control sub-circuit cuts off the path between the third node and the fourth node under the control of the signal of the light-emitting control signal terminal; and one of the brightness decrease stage, the second brightness retention stage and the brightness increase stage further comprises a plurality of light-emitting stages and a plurality of off stages, and the light-emitting stages and the off stages are spaced from each other.

18. The method according to claim 17, wherein a duty ratio of the light-emitting control signal decreases row by row or frame by frame in the brightness decrease stage; the duty ratio of the light-emitting control signal is equal to a first duty ratio in the first brightness retention stage; the duty ratio of the light-emitting control signal is equal to a second duty ratio in the second brightness retention stage, wherein the first duty ratio is higher than the second duty ratio; and the duty ratio of the light-emitting control signal increases row by row or frame by frame in the brightness increase stage.

* * * * *